US010741013B2

(12) United States Patent
Inubushi et al.

(10) Patent No.: US 10,741,013 B2
(45) Date of Patent: Aug. 11, 2020

(54) GAME SYSTEM FOR SHARING A NUMBER OF PRIZES BETWEEN MULTIPLE GAME MACHINES

(71) Applicant: Konami Digital Entertainment Co., Ltd., Minato-ku, Tokyo (JP)

(72) Inventors: Takashi Inubushi, Minato-ku (JP); Kenji Kobayashi, Minato-ku (JP); Masanaka Takahashi, Minato-ku (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 95 days.

(21) Appl. No.: 15/671,966

(22) Filed: Aug. 8, 2017

(65) Prior Publication Data
US 2017/0337767 A1 Nov. 23, 2017

Related U.S. Application Data

(63) Continuation of application No. PCT/JP2016/053379, filed on Feb. 4, 2016.

(30) Foreign Application Priority Data

Feb. 10, 2015 (JP) ................. 2015-024776

(51) Int. Cl.
*A63F 9/24* (2006.01)
*G07F 17/32* (2006.01)
(Continued)

(52) U.S. Cl.
CPC ....... *G07F 17/3216* (2013.01); *G06Q 10/087* (2013.01); *G07F 17/326* (2013.01);
(Continued)

(58) Field of Classification Search
CPC .. G07F 17/3216; G07F 17/32; G07F 17/3253; G07F 17/3244; G07F 17/3255;
(Continued)

(56) References Cited

U.S. PATENT DOCUMENTS

2001/0034259 A1* 10/2001 Luciano ............... G06Q 10/087
463/16
2003/0030539 A1* 2/2003 McGarry ............... G07C 11/00
340/5.9
(Continued)

FOREIGN PATENT DOCUMENTS

JP UH6-83086 11/1994
JP 3068004 5/2000
(Continued)

OTHER PUBLICATIONS

International Search Report (International Application No. PCT/JP2016/053379); dated May 10, 2016; 11 pages.
(Continued)

*Primary Examiner* — Justin L Myhr
(74) *Attorney, Agent, or Firm* — Howard & Howard Attorneys PLLC

(57) ABSTRACT

A game system capable of suppressing the variation in the remaining number of prizes between multiple game machines is provided. A game system includes two game machines that each provide a game and a prize discharge mechanism that discharges a capsule from among multiple capsules that contain a plurality of physical prizes. Additionally, the prize discharge mechanism discharges a capsule when a prize condition is satisfied in at least one of the two game machines.

7 Claims, 14 Drawing Sheets

(51) Int. Cl.
*G06Q 10/08* (2012.01)
*G07F 11/00* (2006.01)

(52) U.S. Cl.
CPC ...... *G07F 17/3246* (2013.01); *G07F 17/3253* (2013.01); *A63F 2250/142* (2013.01); *G07F 11/002* (2013.01); *G07F 17/323* (2013.01)

(58) Field of Classification Search
CPC .. G07F 17/323; G07F 17/3241; G07F 17/326; G07F 17/3269; G07F 17/3286; G07F 17/3248; G07F 7/005; G07F 17/3246; G06Q 10/087
See application file for complete search history.

(56) References Cited

U.S. PATENT DOCUMENTS

| | | | | |
|---|---|---|---|---|
| 2004/0102233 | A1* | 5/2004 | Ostler | G07F 17/32 463/7 |
| 2004/0214642 | A1* | 10/2004 | Beck | A63F 13/327 463/40 |
| 2006/0068918 | A1* | 3/2006 | Nagano | G07F 17/32 463/42 |
| 2006/0194630 | A1* | 8/2006 | Pellegrini | G07F 17/3244 463/25 |
| 2006/0249909 | A1* | 11/2006 | Yumiya | A63F 9/00 273/447 |
| 2007/0051796 | A1* | 3/2007 | Yoshizaki | G07F 9/026 235/381 |
| 2011/0003627 | A1* | 1/2011 | Nicely | G07F 17/3244 463/20 |
| 2012/0220361 | A1* | 8/2012 | Plescia | G07F 17/3202 463/25 |
| 2014/0303774 | A1* | 10/2014 | Schwarzli | G07F 9/02 700/233 |

FOREIGN PATENT DOCUMENTS

| | | |
|---|---|---|
| JP | 2002-113259 | 4/2002 |
| JP | 2002-301264 | 10/2002 |
| JP | 3394099 | 1/2003 |
| JP | 2005-152040 | 6/2005 |
| JP | 4204287 | 10/2008 |
| JP | 4821103 | 9/2011 |

OTHER PUBLICATIONS

Written Opinion of the International Search Authority (International Application No. PCT/JP2016/053379); dated May 10, 2016; 18 pages.
Notification of Reasons for Refusal (JP Patent Application No. 2015-024776); Date of Drafting: Sep. 27, 2016; 6 pages.
Decision to Grant a Patent (JP Patent Application No. 2015-024776); Date of Drafting: Apr. 12, 2017; 6 pages.
Notification of Reasons for Refusal (JP Patent Application No. 2015-024783); Date of Drafting: Jan. 25, 2017; 9 pages.
Decision to Grant a Patent (JP Paten Application No. 2015-024783); dated Sep. 15, 2017; Includes English Translation; 6 pages.

* cited by examiner

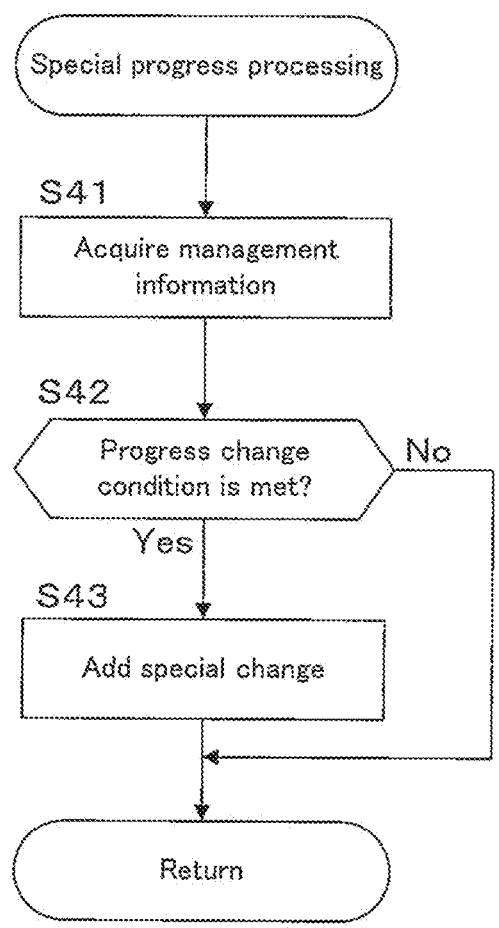

GAME SYSTEM FOR SHARING A NUMBER OF PRIZES BETWEEN MULTIPLE GAME MACHINES

CROSS-REFERENCE TO RELATED APPLICATION

This application is a continuation of PCT Patent Application No. PCT/JP2016/053379, filed Feb. 4, 2016 which claims priority to JP Patent Application No. 2015-024776, filed Feb. 10, 2015, the disclosures of which are hereby incorporated by reference in their entirety.

TECHNICAL FIELD

The present invention relates to a game system that discharges each physical prize.

BACKGROUND ART

Game systems already exist that discharges each physical prize. For example, there is known a game apparatus which discharges a character card corresponding to a character in a game as the physical prize (for example, refer to Patent Document #1). On the other hand, there is also known a capsule discharge apparatus which discharges a prize with capsule shape storing objects of various types in the inside (for example, refer to Patent Document #2). Apart from these, as Prior Art Documents relating to the present invention, there are Patent Document #3 and Patent Document #4.

CITATION LIST

Patent Literature

Patent Document #1: Japanese Laid Open Patent Publication 2002-301264.
Patent Document #2: Japanese Patent Publication 3068004.
Patent Document #3: Japanese Patent Publication 4821103.
Patent Document #4: Japanese Patent Publication 4204287.

SUMMARY OF INVENTION

Technical Problem

In Patent Document #1, the character card (prize) for discharge is stored in the inside of the game apparatus, the game apparatus itself discharges the character card. Therefore, for example, if a plurality of game apparatuses exists, there is a possibility that variation in stock situation of prizes arises between the game apparatuses. In concrete terms, for example, there is a possibility that a game apparatus with few stocks exists, while a game apparatus with many stocks exists. In this case, there is caused irrationality that the stocks are not enough at the one game apparatus, and remain much at the other game apparatus. As the result, there is a possibility that the entirety utilization rate of the plurality of game apparatuses decrease. Further, it is also difficult to adjust the stocks between the game apparatuses. The same applies to a capsule discharge apparatus such as Patent Document #2.

Accordingly, it is an object of the present invention to provide a game system that can prevent variation in the stock number of prizes between the game machines.

Solution to Technical Problem

A game system of the present invention is a game system comprising: a plurality of game machines configured to provide a game respectively; and a prize discharge mechanism configured to discharge each prize from among a plurality of physical prizes, and wherein the prize discharge mechanism discharges each prize when a prize condition is met in at least one of the plurality of game machines.

BRIEF DESCRIPTION OF DRAWINGS

FIG. 14 is a figure showing an example of a flow chart of a special progress processing routine.

DESCRIPTION OF EMBODIMENTS

Figure 1:
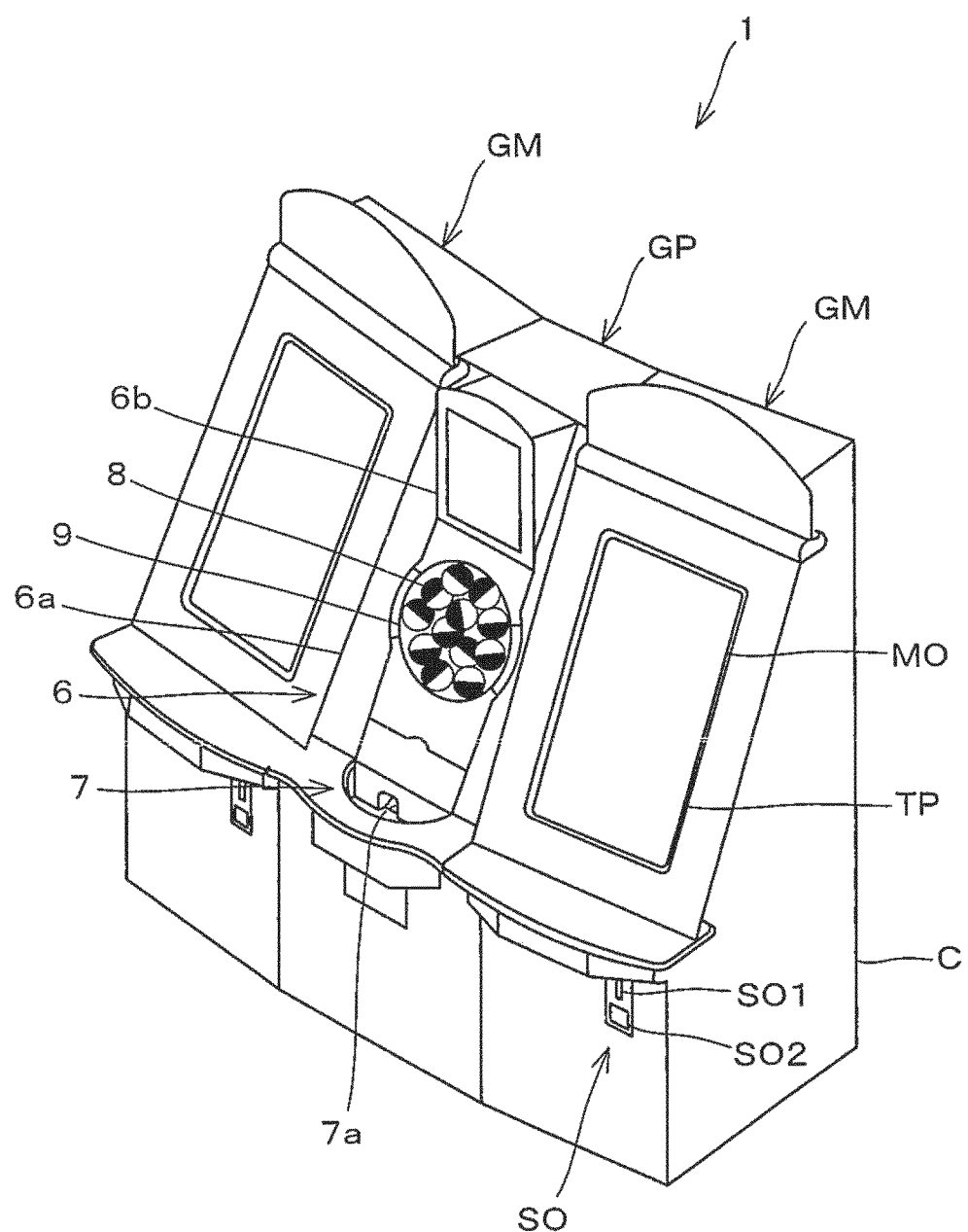
FIG. 1 is a figure schematically showing the external appearance of a game system according to an embodiment of the present invention.

In the following, a game system according to an embodiment of the present invention will be explained. FIG. 1 is a figure schematically showing the external appearance of a game system according to an embodiment of the present invention. As shown in FIG. 1, as one example, the game system 1 includes the prize discharge mechanism GP and two game machines GM.

The prize discharge mechanism GP is a mechanism for supplying users with prizes which are accumulated in the inside. As one example, the prize discharge mechanism GP is connected to these two game machines GM, and used. That is, the prize discharge mechanism GP is shared by the two game machines GM. The prize discharge mechanism GP comprises, for example, an accumulation part 6 and a discharge part 7. The accumulation part 6 is a part for accumulating a plurality of prizes. For example, a plurality of capsules 8 is accumulated in the accumulation part 6. Each capsule 8 is a spherical case of capsule type which stores one of various kinds of physical benefits (objects)

such as a figure and so on, in the inside. That is, actual prizes (benefits) are stored in the capsules 8. And, the prize discharge mechanism GP provides prizes via the capsules 8.

A front side cover 6a is provided at the front side of the accumulation part 6. And, an upper side cover 6b is provided at the upper side of the accumulation part 6. The front side cover 6a and the upper side cover 6b are cover members for forming the front side or the upper side of the accumulation part 6. In the inside of the accumulation part 6, space is formed by the front side cover 6a and the upper side cover 6b. As one example, a steric window with a dome shape is provided on the front side cover 6a. Therefore, the accumulation part 6 provides information. (for example, the number of stocks) of the capsules 8 in the inside visually, to outside through the window 9.

On the other hand, the discharge part 7 is a part for supplying users with prizes inside the accumulation part 6. A downside discharge port 7a is formed in the discharge part 7. The downside discharge port 7a is connected to a connection path (not shown). The connection path is a path which connects the inside to the outside of the accumulation part 6. That is, the downside discharge port 7a is an opening which connects the inside to the outside of the accumulation part 6 via the connection path. And, the capsules 8 inside the accumulation part 6 are discharged to the discharge part 7 (outside) via the downside discharge port 7a. In concrete terms, the prize discharge mechanism GP discharges each capsule 8 inside the accumulation part 6 to the outside one by one from the downside discharge port 7a, when a prize condition is met. As one example, in this manner, the prize discharge mechanism GP is configured as a vendor unit which appropriately supplies users with the capsules 8 inside the accumulation part 6 (so-called Gacha system or capsule toy machine).

On the other hand, as one example, the game machine GM is configured as a game machine for business use (i.e. for commercial use). A game machine for business use is a game machine that allows users to play a game within a range for a fee or without a fee. As one example, the game machine GM provides a game for a fee. Further, as one example, the game machine GM provides the game after collecting a predetermined consideration. In concrete terms, for example, in exchange for spending (collecting) of a predetermined consideration, the game machine GM provides a game using the prize discharge mechanism GP within a range corresponding to that consideration. Further, not only normal play (from the start) but also continuance play (from the middle of the game) is included within the range corresponding to the predetermined consideration. That is, if the game has been ended in the middle, with collection of a predetermined consideration, the game machine GM also provides a game restarting from the middle at which the game has been ended, as the range corresponding to the consideration. An appropriate number of the game machines GM are installed in a commercial facility such as an arcade or the like.

The game machine GM has a chassis C. A monitor MO is provided in the chassis C. A transparent touch panel TP is overlaid over the surface of the monitor MO. The touch panel TP is a per se known input device that outputs a signal corresponding to the position of the contact of finger or the like. A coin collection mechanism SO serving as a consideration collection device is provided at the front side of the chassis C. The coin collection mechanism SO is a mechanism for executing collection, return of coins, and so on.

The coin collection mechanism SO has a coin input port SO1 and a coin discharge port SO2. The coin input port SO1 is used for inputs of coins. And, the coin discharge port SO2 is used for discharges (returns) of coins. In concrete terms, the coin input port SO1 is used for accepting an input of coins. Further, the coins which have been input into the coin input port SO1 are stored in a collection part (not illustrated). And, the coins are collected (spent), with being stored into the collection part. That is, as one example, a predetermined consideration is consumed (paid) via the coin input port SO1. In this manner, as one example, coins are used for the collection of the predetermined consideration.

On the other hand, coins which can be not stored in the collection part may be input from the coin input port SO1. Or, there are also coins that the collection part fails to store after passing through the coin input port SO1. In this case, these coins are returned from the coin discharge port SO2. That is, as one example, the coin discharge port SO2 is used for such a return of coins. It should be understood that, in addition to the above, the game machine GM may be provided with input devices and output devices of various types that are equipped to conventional commercial game machines, such as a volume control switch, a power supply switch, a power supply lamp, and so on.

Figure 2:
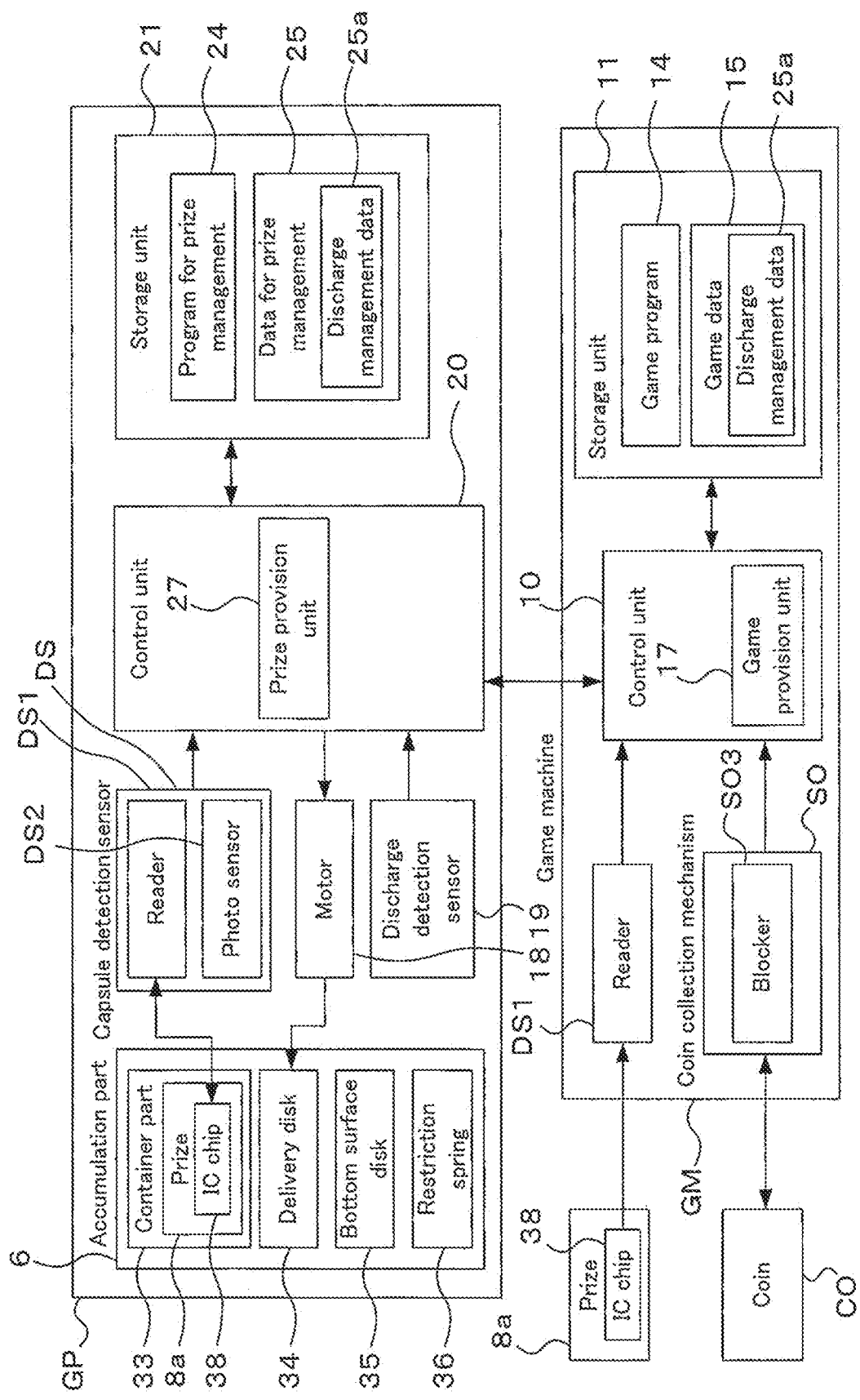
FIG. 2 is a figure showing the principal portions of the control system of a prize discharge mechanism and a game machine.

Next, the principal portions of the control system of this game system 1 will be explained. FIG. 2 is a figure showing the principal portions of the control system of the prize discharge mechanism GP and the game machine GM. As shown in FIG. 2, the game machine GM has a reader DS1, in addition to the coin collection mechanism SO described above. Further, a control unit 10 serving as a computer and a storage unit 11 are also provided in the game machine GM.

The control unit 10 is built as a computer unit in which a microprocessor and peripheral devices of various types such as internal storage devices required for the operation of the microprocessor (for example, ROM and RAM) and so on are combined. As one example, the coin collection mechanism SO described above, a reader DS1, and the storage unit 11 are connected to the control unit 10. It should be understood that, in addition to the monitor MO, and touch panel TP which are described above, in a similar manner to the case with other per se known types of game machine, input devices and/or output devices of various types such as a speaker, a card reader (as one example, well-known device which reads information of various types recorded in storage media out of touch, using short distance wireless communication), and so on, may be connected to the control unit 10. However, such devices are not shown in the figure.

The reader DS1 is well-known device for reading information of IC chip (a type of RFID, sometime it is called IC tag). For example, an IC chip 38 is provided on a prize 8a in each capsule 8. In each IC chip 38, there is recorded management information needed for management of the prize 8a. The management information includes, for example, prize ID serving as prize information, details such as a types of the prize 8a, shipment time, shipment place, and so on. The prize ID is a unique ID for identifying each prize 8a. That is, individual prize 8a is specified by the prize ID. As one example, the reader DS1 is used for reading such an IC chip 38. And, for example, the reader DS1 provides (outputs) the read result from the IC chip 38, that is, acquired information of various types to the control unit 20.

As described above, the coin collection mechanism SO is a mechanism which is used for collection and return of coins CO. Further, the coin collection mechanism SO has a blocker SO3. The blocker SO3 is a well known member for blocking the collection of coins CO. As one example, the blocker SO3 is configured movably. For example, the blocker SO3 works between a normal state which does not block the collection of coins CO and a stop state which blocks the collection of coins CO.

In concrete terms, for example, the blocker SO3 does not block a movement of coins CO which are input from the coin input port SO1, in the normal state. As the result, in this state, the coins CO which are input from the coin input port 501 are stored in the collection part. That is, in the normal state, the coins CO which are input from the coin input port SO1 are not affected by the Mocker SO3, and are collected as they are. On the other hand, as one example, in the stop state, the blocker SO3 functions so as to block the movement of the coins CO passing through the coin input port SO1 to the collection part. As the result, in this case, the coins CO are not stored in the collection part, and are returned from the coin discharge port SO2. That is, the blocker SO3 works so that the coin collection mechanism SO forms a state which does not collect (spend) coins CO input through the coin input port SO1 and which returns it from the coin output port SO2. As one example, such a blocker SO3 is provided in the coin collection mechanism SO.

Further, the storage unit 11 is capable of maintaining its storage even without supply of any electrical power, for example, it may be built to incorporate a magnetic recording medium, an optical recording medium, a flash SSD (Solid State Drive), or the like. A game program 14 and game data 15 are stored in the storage unit 11. The game program 14 is a computer program that is required in order for the game machine GM to supply a game. Along with execution of the game program 14, a game provision unit 17 is provided in the interior of the control unit 10. This game provision unit 17 executes processing of various types required for provision of the game. The game provision unit 17 is a logical device that is implemented by a combination of computer hardware and a computer program. It should be understood that further logical devices of various types apart from the above may be provided internally to the control unit 10. However, these are not shown in the figures.

The game data 15 is data that can be referred to along with execution of the game program 14. The game data 15 includes, for example, image data, and sound effect data. The image data is data that is needed in order to display images of various types for the game. The sound effect data is data that is needed in order to reproduce sound of various types for the game. Furthermore, the game data 15 includes also discharge management data described below. It should be understood that, apart from the above, the game data 15 may include data of various types required for providing the game. However, it is not shown in the figures.

On the other hand, as one example, the prize discharge mechanism. GP comprises, in addition to the accumulation part 6 described above, a motor 18, a discharge detection sensor 19, and a capsule detection sensor DS. Further, the prize discharge mechanism GP also comprises a control unit 20 and a storage unit 21. The control unit 20 is built as a computer unit in which a microprocessor and peripheral devices of various types such as internal storage devices required for the operation of the microprocessor (for example, ROM and RAM) and so on are combined. For example, the storage unit 21, the motor 18, the discharge detection sensor 19, and the capsule detection sensor 20 which are described above are connected to the control unit 20. It should be understood that, apart from the above, for example, input devices and/or output devices of various types may be connected to the control unit 20. However, such devices are not shown in the figure.

The storage unit 21 is capable of maintaining its storage even without supply of any electrical power; for example, it may be built to incorporate a magnetic recording medium, an optical recording medium, a flash SSD (Solid State Drive), or the like. A program 24 for prize management and data 25 for prize management are stored in the storage unit 11. The program 24 for prize management is a computer program that is required in order for the prize discharge mechanism GP to manage capsules 8. Along with execution of the program 24 for prize management, a prize provision unit 27 is provided in the interior of the control unit 20. This prize provision unit 27 executes processing of various types required for managing prizes. The prize provision unit 27 is a logical device that is implemented by a combination of computer hardware and a computer program. It should be understood that further logical devices of various types apart from the above may be provided internally to the control unit 20. However, these are not shown in the figures.

The data 25 for prize management is data that can be referred to along with execution of the program 24 for prize management. The data 25 for prize management includes, for example, the discharge management data 25a serving as prize information data. The discharge management data 25a is data for managing each prize 8a which was discharged. For example, the discharge management data 25a includes information of prize IDs, discharge date and time, and so on. The prize IDs are as described above. The discharge date and time is information indicating date and time at which each prize was discharged. It should be understood that, apart from the above, for example, the discharge management data 25a may include information of user IDs, a discharge chassis, and so on. The discharge chassis is information indicating each game machine GM which has discharged each prize 8a. That is, for example, when unique chassis IDs for each game machine GM and so on are managed in order to identify each game machine GM, the discharge management data 25a may include information of this chassis IDs as the discharge chassis. Similarly, the user IDs are information of unique IDs for identifying each user. For example, if a user ID is acquired by an ID card and so on when the game is played, the discharge management data 25a may include such information.

As one example, the accumulation part 6 comprises a container part 33, a delivery disk 34 serving as a rotation member, a bottom surface disk 35, and a restriction spring 36. The container part 33 is an upper side part of the accumulation part 6. In concrete terms, the container part 33 is, as one example, a part having space for storing the capsules 8 in the inside. For example, the container part 33 forms circumference and an upper surface of the accumulation part 6. Therefore, the container part 33 includes the front side cover 6a, and the upper side cover 6b described above. That is, in the container part 33, a wall of the front side is formed by the front side cover 6a, and the upper surface is formed by the upper side cover 6b.

The delivery disk 34 is a member for delivering the capsules 8 of the inside of the accumulation part 6 to the discharge part 7. As one example, the delivery disk 34 is arranged on the lower side of the container part 33. In other words, the delivery disk 34 is arranged on the lower side of each capsule 8, for delivering each capsule 8 stored in the container part 33 to the discharge part 7. Further, as one example, the deliver)/disk 34 is driven rotationally, by the motor 18. And, with a rotation, the delivery disk 34 delivers each capsule 8 located on the lower side in sequence one by one, so that each capsule 8 is discharged one by one from the discharge part 7. The bottom surface disk 35 is a member which is arranged further down the delivery disk 34 so as to assist the delivery of the delivery disk 34. The restriction spring 36 is a spring which is arranged so as to restrict a part of movement of each capsule 8 in the inside of the accumulation part 6.

On the other hand, the capsule detection sensor DS is a sensor for detecting the presence of a delivery of the capsule 8. In concrete to is, as one example, the capsule detection sensor DS is used for detecting a delivery situation of the delivery disk 34. Further, the capsule detection sensor DS includes, for example, a reader DS1 and some photo sensor DS2. The photo sensor DS2 is sell-known sensor using light-emitting element emitting infrared and so on. The photo sensor DS2 outputs the detection results to the control unit 20.

The reader DS1 is as described above. For example, the reader DS1 functions as the capsule detection sensor DS by acquiring information from IC chip. And, for example, the reader DS1 provides (outputs) the read result from the IC chip 38, that is, acquired management information to the control unit 20. And, as one example, the control unit 20 detects a delivery situation of the capsules 8 by the presence of the acquirement of the information from the IC chip 38. In this manner, the reader DS1 functions as the capsule detection sensor DS by the presence of the provision of the information from the IC chip 38.

As described above, the motor 18 is a drive source for driving the delivery disk 34 rotationally. The drive of the motor 18 is controlled by the control unit 20. The discharge detection sensor 19 is a sensor for detecting the presence of the capsule 8 which is discharged from the downside discharge port 7a. For example, the discharge detection sensor 19 may be a well-known sensor detecting the presence of the capsule 8 which passes the downside discharge port 7a. In concrete terms, for example, the discharge detection sensor 19 may have a member which is pushed by the capsule 8 passing the downside discharge port 7a (but it does not block the pass of the capsule 8). Further, the discharge detection sensor 19 may output a signal indicating discharge of a capsule 8 when pushed with the pass of the capsule 8. As one example, the discharge detection sensor 19 may be configured in this manner. Therefore, the discharge detection sensor 19 is arranged near the downside discharge port 7a of the connection path. Further, the detection result of the discharge detection sensor 19 is output to the control unit 20.

Figure 3:
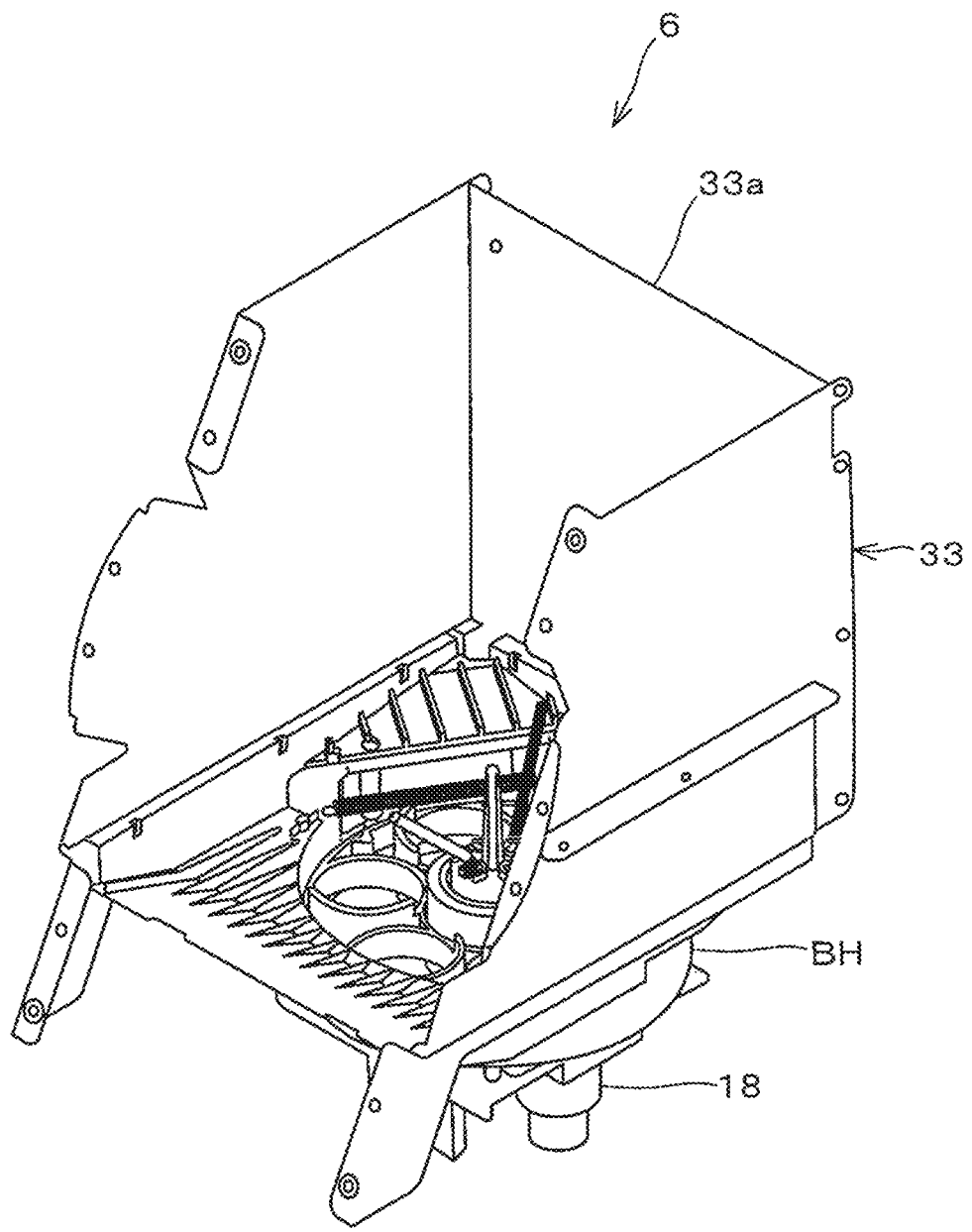
FIG. 3 is a figure schematically showing an example of a perspective view of an accumulation part in which the front side cover and the upper side cover are removed.
Figure 4:
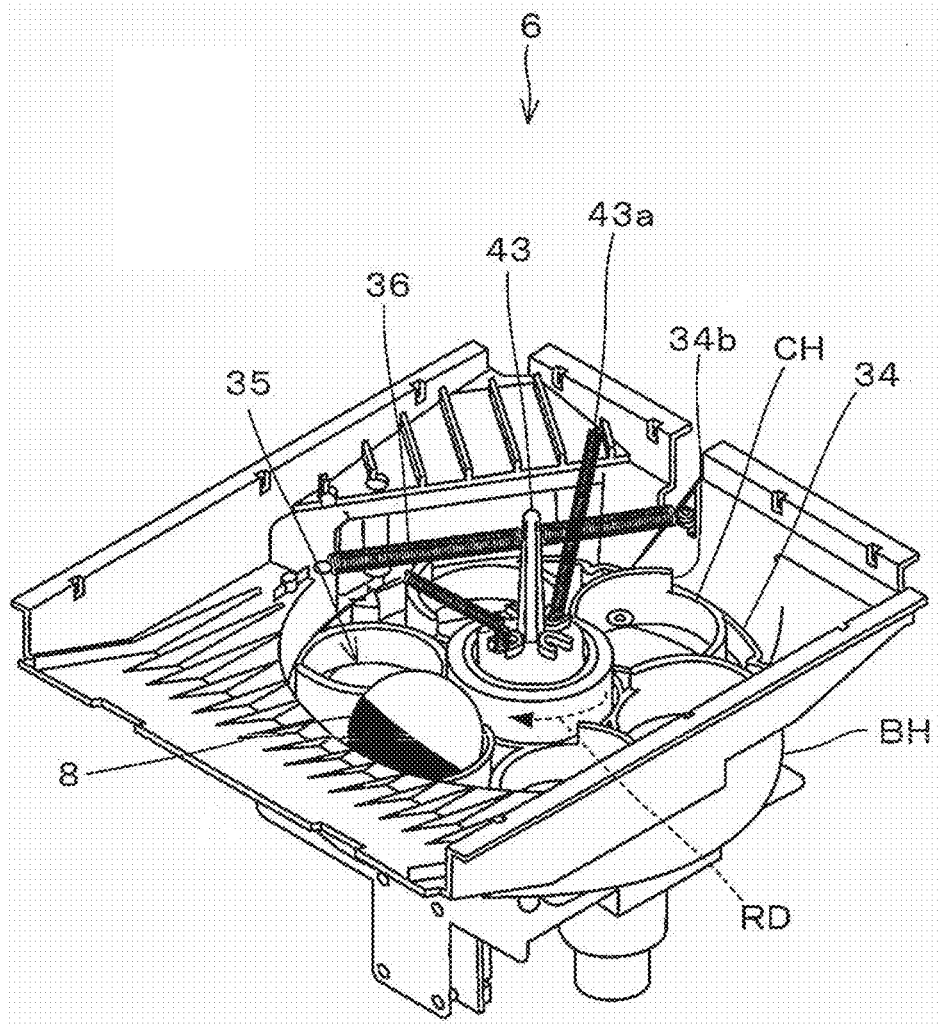
FIG. 4 is a figure schematically showing the accumulation part in which a wall part is removed in the example of FIG. 3.
Figure 5:
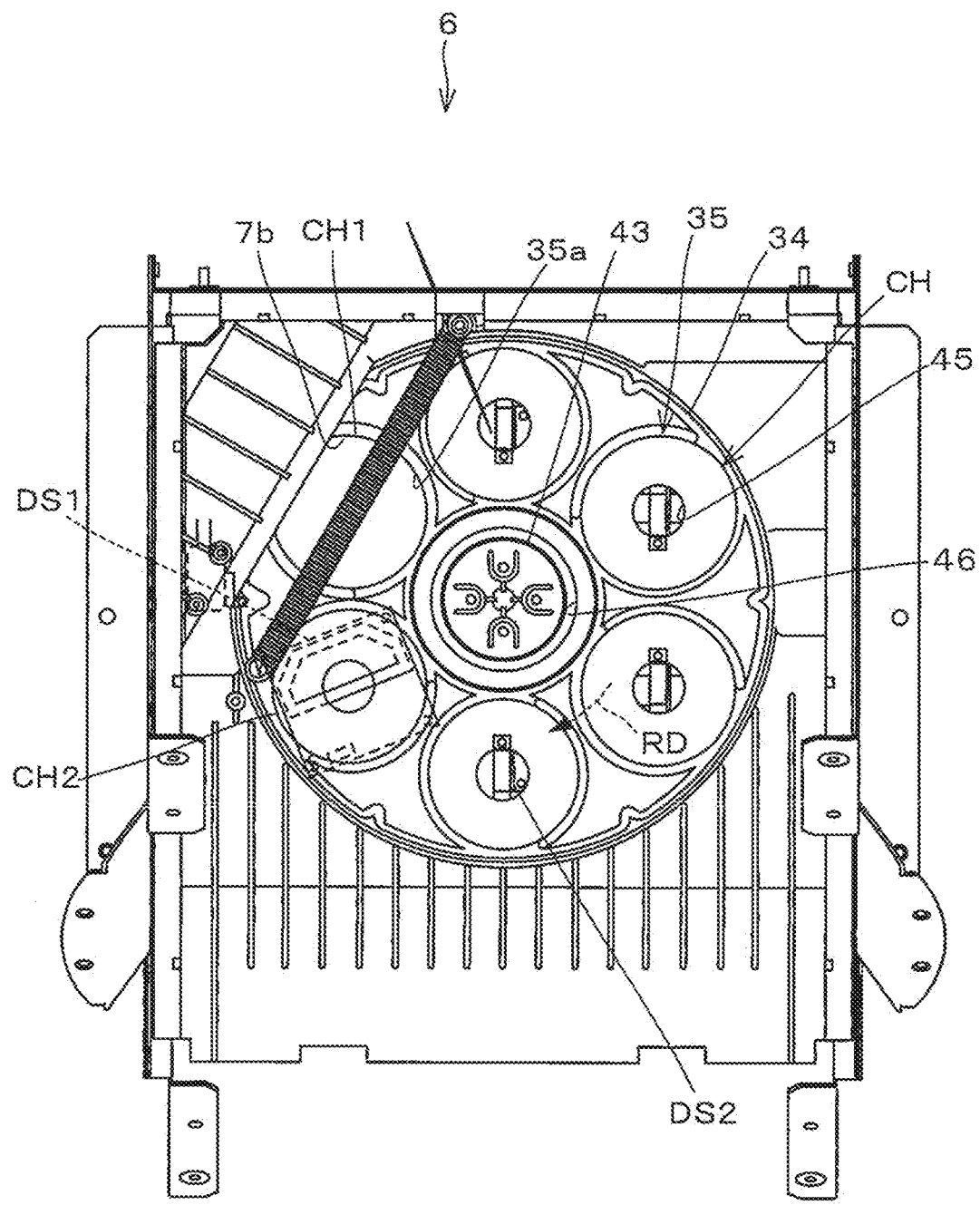
FIG. 5 is a figure schematically showing the plane view of the accumulation part in the example of FIG. 4.

With reference to FIG. 3 to FIG. 5, the prize discharge mechanism GP will be further explained. FIG. 3 is a figure schematically showing an example of a perspective view of the accumulation part 6 in which the front side cover 6a and the upper side cover 6b are removed. As shown in FIG. 3, space for storing a lot of capsules 8 is formed in the inside of the container part 33. Further, for example, the container part 33 has wall part 33a. The wall part 33a is a member forming side walls surrounding the inside space. In concrete terms, the wall part 33a forms surrounding side walls other than a front side wall formed by the front side cover 6a, among the walls forming the inside space of the accumulation part 6. Further, as one example, a tubular part BH extending to the lower side cylindrically is formed, on the lower side of the container part 33. Similarly, the motor 18 is arranged on the further lower side of the tubular part BH.

FIG. 4 is a figure schematically showing the accumulation part 6 in which the wall part 33 is further removed in the example of FIG. 3. As shown in FIG. 4, as one example, in the inside of the tubular part BH, the delivery disk 34 and the bottom surface disk 35 are arranged in order from the top. As one example, while the delivery disk 34 is arranged so as to be capable of rotating, the bottom surface disk 35 is arranged fixedly so as not to move.

Further, as one example, the delivery disk 34 has a plurality of passage opening parts CH. Each passage opening part CH is a part opening so as to connect the upper surface side 34U and the bottom surface side 34D of the delivery disk 34. In other words, each passage opening part CH is an opening part so that each capsule 8 located on the upper side of the delivery disk 34 can pass to the lower side of the delivery disk 34. Therefore, each passage opening part CH is formed so as to pass through the delivery disk 34 in the thickness (height) direction. Further, each passage opening part CH is formed to a predetermined height (depth) based on the size (radius) of each capsule 8. In concrete terms, as one example, six passage opening parts CH are formed on the deliver disk 34. As one example, each passage opening part CH is formed to a size and shape corresponding to each capsule 8 so that each capsule 8 can pass. As one example, each passage opening part CH is formed to round shape with a size larger than each capsule 8 so that each capsule 8 can pass easily and a plurality of capsules 8 do not enter it. That is, each passage opening part CH is formed to the size and shape in which each capsule 8 passes one by one.

Furthermore, an extended part 34b is also formed at the part of opening on the upper side of each passage opening part CH. The extended part 34b is a part extending so as to extend the height of each passage opening part CH. As the result, on the upper side of a part of each passage opening part CH, there is formed a part which is higher than other parts. Further, the extended part 34b of each passage opening part CH is arranged so as to be located at the back side along with the rotation direction RD of the delivery disk 34. That is, the extended part 34b is provided on the upper side of the opposite side to the rotation direction RD of each passage opening part CH. Therefore, when the delivery disk 34 rotates, the extended part 34b functions so as to assist storing each capsule 8 to each passage opening part CH.

The bottom surface disk 35 is formed to shape of a hoard surface so as to follow the bottom surface of the tubular part BH. As the result, the bottom surface disk 35 blocks the lower side of each passage opening part CH, and functions as the bottom surface of each passage opening part CH. That is, the bottom surface disk 35 is arranged so as to block the pass of each capsule 8, and keep each capsule 8 in each passage opening part CH. Due to this, in each passage opening part CH, a capsule 8 which does not pass and stays there is stored. As the result, when the delivery disk 34 rotates, with the rotation, each passage opening part CH rotates with the capsule 8 which stays there, that is, the capsule 8 which is stored there. As the result, the delivery disk 34 delivers the capsule 8 which is in each passage opening part CH in the rotation direction sequentially through such the passage opening part CH.

Further, the restriction spring 36 is arranged on the upper side of the delivery disk 34. In concrete terms, the restriction spring 36 is arranged so as to cross the upper side of one of the six passage opening parts CH. As the result, the restriction spring 36 restricts entry of the capsules 8 to this one passage opening part CH. One the other hand, the restriction spring 36 is arranged on a position higher than the height of a capsule 8 which is stored in each passage opening part CH. Therefore, the restriction spring 36 does not obstruct the capsules 8 which are located on the lower side and which move with the passage opening parts CH with rotation of the delivery disk 34. That is, the restriction spring 36 is arranged so as to allow movement of the capsules 8 to the lower side with delivery of the delivery disk 34, while restricting the direct entry of the passage opening part CH located on the lower side of it.

Furthermore, a stirring part 43 is provided in the central part of the delivery disk 34 and the bottom surface disk 35. The stirring part 43 is a unit for stirring the capsules 8 in the inside of the accumulation part 6. In concrete terms, as one example, the stirring part 43 is arranged so as to pass through the central parts of the delivery disk 34 and the bottom surface disk 35. And, in a similar manner to the delivery disk 34, the stirring part 43 is driven rotationally by the motor 18. Further, as one example, two springs 43a for stirring are provided on the upper side of the stirring part 43. Each spring 43a for stirring is arranged so as to extend obliquely upward direction intersecting the vertical direction in order to improve stirring efficiency. The springs 43a for stirring rotate with the stirring part 43. That is, the stirring part 43 rotates so as to affect a state (position and so on) of each capsule 8 in the inside of the accumulation part 6 by the springs 43a for stirring.

FIG. 5 is a figure schematically showing the plane view of the accumulation part 6 in the example of FIG. 4. However, in the example of FIG. 5, the springs 43a for stirring do not illustrated for the convenience of the explanation. As shown in FIG. 5, as one example, an upper-side discharge port 7b is provided on the lower side of the accumulation part 6. The upper-side discharge port 7b is an opening for discharging the capsules 8 in the inside of the accumulation part 6 to the outside. The upper-side discharge port 7b opens toward the connection path located on the lower side. That is, as described above, the upper-side discharge port 7b is connected to the downside discharge port 7a via the connection path. Further, as one example, in a similar manner to the passage opening part CH, the upper-side discharge port 7b is formed to round shape with a size larger than each capsule 8 so as to discharge one capsule 8, while preventing the entry of other capsules 8.

Similarly, the bottom surface disc 35 has a connection opening part 35a. The connection opening part 35a is an opening part for supplying the upper-side discharge port 7b with the capsules 8. In concrete terms, the connection opening part 35a opens so as to connect the upper side and the lower side of the bottom surface disc 35. Therefore, the upper side of the bottom surface disc 35 is connected to the upper-side discharge port 7b via the connection opening part 35a. And, the connection opening part 35a is arranged on a position corresponding to the upper-side discharge port 7b. As one example, the connection opening part 35a is arranged on the position of the passage opening part CH located on the lower side of the restriction spring 36 (hereafter, this passage opening part CH is described sometime as the connection passage opening part CH1, conveniently).

Further, in a similar manner to the passage opening part CH and so on, the connection opening part 35a is formed to round shape with a size larger than each capsule 8 so as to pass one capsule 8, while preventing the entry of other capsules 8. As the result, the bottom surface disk 35 is formed so as to supply the upper-side discharge port 7b with the capsule 8 which passes through the connection passage opening part CH1 via the connection opening part 35a at the connection passage opening part CH1. On the other hand, as described above, the bottom surface disk 35 is formed so as to block the lower side of each passage opening part CH at the remaining five passage opening parts CH other than the connection passage opening part CH1.

Further, holes 45 for sensor are further provided on positions of the remaining five passage opening parts CH other than the connection passage opening part CH1 of the bottom surface disk 35. The holes 45 for sensor are holes which are used for detection of the capsule 8 by the capsule detection sensor DS. In concrete terms, for example, the holes 45 for sensor are holes for the reader DS1 or the photo sensor IDS2 to output radio waves or light to the capsule 8 in each passage opening part CH. The holes 45 for sensor open, in a similar manner to the connection opening part 35a, so as to connect the upper side and the lower side of the bottom surface disk 35. However, the holes 45 for sensor are smaller than the connection opening part 35a. In concrete terms, the size of each hole 45 for sensor is much smaller than the diameter of a capsule 8. Duet to this, each capsule 8 can not pass through each hole 45 for sensor.

Further, the reader DS1 and the photo sensors DS2 are arranged under the tubular part BH. That is, the reader DS1 and the photo sensor DS2 are arranged on the opposite side of the delivery disk 34 so as to sandwich the bottom surface disk 35. Therefore, the holes 45 for sensor are also provided in the tubular part BH similarly.

On the other hand, the delivery disk 34 is arranged so that one of the passage opening parts CH corresponds to the position of the upper-side discharge port 7b. That is, the delivery disk 34 is arranged so that one of the passage opening parts CH functions as the connection passage opening part CH1. On the other hand, location of each passage opening part CH changes sequentially with a rotation of the delivery disk 34. Specifically, for example, with this rotation, the location of each passage opening part CH changes so that each passage opening part CH functions as the connection passage opening part CH1 sequentially in the rotation direction RD. In concrete terms, the passage opening part CH one step before the connection passage opening part CH1 in the rotation direction RD (hereafter, conveniently, this is described sometime as next passage opening part CH2) functions as the connection passage opening part CH1 next time. And, the passage opening part CH two steps before the connection passage opening part CH1 in the rotation direction RD functions sequentially as the connection passage opening part CH1 at the time after next. The same applies to the following each passage opening part CH.

Further, each passage opening part CH rotates with the capsule 8 inside it. As the result, with this rotation, each passage opening part CH delivers the capsule 8 stored inside it to the location of the upper-side discharge port 7b, so as to function sequentially as the connection passage opening part CH1. Further, the connection opening part 35a is provided on the location of the connection passage opening part CH1. Therefore, the connection passage opening part CH1 is different from other passage opening parts CH, and is connected to the upper-side discharge port 7b via the connection opening part 35a. Due to this, each capsule 8 is supplied to the upper-side discharge port 7b at the location of the connection passage opening part CH1. The delivery disk 34 supplies, by such the rotation, the upper-side discharge port 7b with the capsule 8 inside the accumulation part 6 one by one via each passage opening part CH.

The capsule detection sensor DS is provided for each passage opening part CH other than the connection passage opening part CH1. That is, five capsule sensors DS corresponding to the five passage opening parts CH respectively are arranged on the lower side of the tubular part BH through the holes 45 for sensor. As one example, the five capsule detection sensor DS comprise one reader DS and four photo sensor DS2. In concrete terms, as one example, the reader DS is arranged at the passage opening part CH one step before the connection passage opening part CH1 in the rotation direction RD, that is, on the lower side of the next passage opening part CH2. Therefore, via the reader DS1, the information recorded in the IC chip 38 of each capsule 8 is acquired at the next passage opening part CH2, in other words, at the location one step before the discharge. On the other hand, the photo sensors DS2 are arranged respectively at the other four passage opening parts CH, that is, at the lower side of the passage opening parts CH other than the connection passage opening part CH1 and the next passage opening part CH2.

Further, an insertion port 46 for the stirring part 43 is formed in the central part of the delivery disk 34 and the bottom surface disk 35. The insertion part 46 is formed so as to pass through the delivery disk 34 and the bottom surface disk 35. The stirring part 43 is inserted into the insertion port 46. Therefore, movement of the capsule 8 at the central part is restricted by the stirring part 43. In concrete terms, entries to the connection passage opening part CH1 from the central part side are prevented. As the result, the capsule 8 which is discharged from the upper-side discharge port 7b is limited to the delivery by the delivery disk 34. As one example, the prize discharge mechanism GP is configured in this manner.

Next, a game which is provided by the game machine GM will be explained. The game machine GM may provide games of various types using the prize discharge mechanism GP. For example, the game machine GM may provide an action game, a role playing game, a simulation game, a puzzle game, a shooter game, and so on.

Further, each game machine GM may use each prize 8a which is supplied via the prize discharge mechanism GP, in the game. For example, when prizes 8a are associated with characters of various types, a character corresponding to each prize 8a may be reproduced in the game. As one example of such prizes 8a, figures of various types corresponding to characters of various types, and so on may be used. Furthermore, when the game machine GM uses a prize 8a which was supplied by the game machine GM itself, the game machine GM may add a special change to the progress of the game. Further, two game machines GM which share the prize discharge mechanism GP may be included in the self range of each game machine GM. That is, in the two game machines GM which share the prize discharge mechanism GP, when a prize 8a which was supplied by any one of these game machines GM is used, the special change may be added. As the special change, for example, there may be used a provision of special item, a special development of the game, a use of special character, and so on. As one example, such a game is provided through the game machine GM.

Further, the game machine GM uses, for example, the prize discharge mechanism GP when a prize condition is met. That is, as one example, the prize discharge mechanism GP discharges (ejects) each prize 8a when the prize condition is met in each game machine GM. The prize condition may be met when a predetermined consideration has been just collected (spend) in each game machine GM. Or, the target of the prize condition may be both of game machines GM. That is, the prize condition may be met when both of game machines have met a predetermined condition (this may be different for each game machine GM), for example, when considerations have been collected at the both of game machines GM, and so on. Or, the prize condition may be met for each game machines GM. That is, for example, a prize 8a may be supplied as a discharge of one game machine GM when a consideration has been collected in the one game machine GM. Further, the prize condition may relate to the game which is provided by each game machine GM. In concrete terms, for example, the game which is provided by each game machine GM may have a plurality of modes. As one example, each mode means a game in which play method is different. And, the prize condition may be associated with and met in these. Hereafter, as one example, a case in which the prize condition is associated with and met in modes will be explained.

Figure 6:
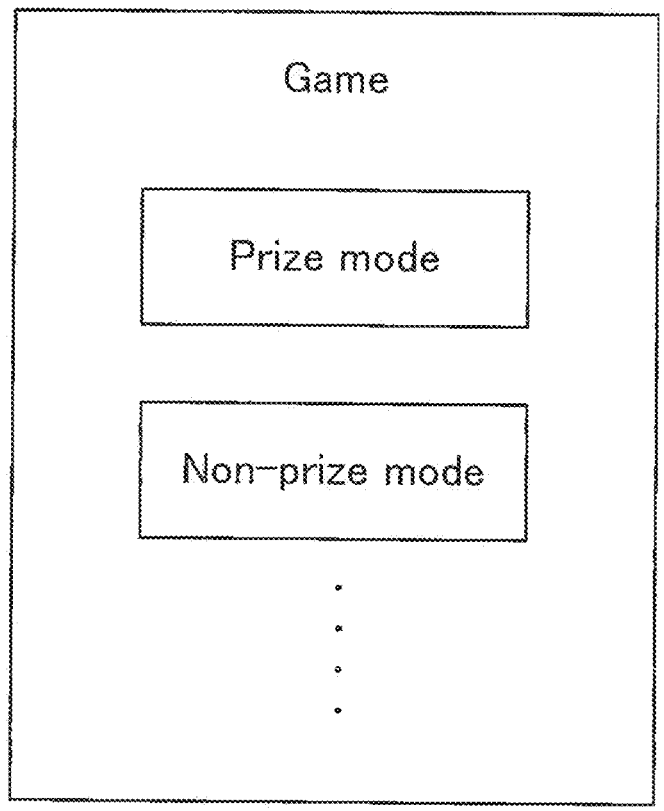
FIG. 6 an explanatory figure for explaining one example of a plurality of modes.

FIG. 6 is an explanatory figure for explaining one example of the plurality of modes. As shown in FIG. 6, for example, a game which is provided by the game machine GM may include a prize mode and a non-prize mode. The prize mode is a mode relating to ejection (discharge) of a prize 8a. In concrete terms, for example, the prize condition is always met with a play of the prize mode, that is when the prize mode is played. In this case, when the prize mode is played, a prize 8a is always ejected via the prize discharge mechanism GP. Further, as one example, an actual discharge of the prize 8a is executed with the end of the play of the prize mode. It should be understood that the prize condition may be met according to the play situation when the prize mode has been played.

On the other hand, the non-prize mode is a mode not relating to ejection of the prize 8a. That is, even if the non-prize mode is played, the prize 8a is not ejected. In other words, the prize condition relates to the prize mode of the game, and does not relate to the non-prize mode. Therefore, a predetermined consideration which should be collected may be different between a case in which the prize mode is played and a case in which the non-prize mode is played. For example, the predetermined consideration which should be collected in the case in which the prize mode is played may be higher than that of the non-prize mode. As one example, in this manner, the game of each game machine GM may have two modes based on the discharge of the prize 8a. And, as one example, the prize condition is met when the prize mode is played, that is when the prize mode is selected as a play target among the plurality of modes.

Next, a behavior of the game system 1 when the stock number of prizes 8a accumulated in the prize discharge mechanism GP is few will be explained. As described above, at the prize discharge mechanism GP, each capsule 8 in the accumulation part 6 is delivered and discharged one by one, by the delivery disk 34. Further, on the lower side of the five passage opening parts CH other than the connection passage opening part CH1, there is provided the capsule detection sensor DS which detects whether or not these are storing the capsules 8. That is, the detection of whether or not each passage opening part CH scheduling the delivery after the next time can deliver the capsule 8, is executed by the capsule detection sensors DS. Therefore, as the number of the remaining prizes, there is detected the stock quantity equal to or more than at least five, or the specific stock number information within five.

As one example, this stock number information is reflected to each game machine GM. For example, when the stock number information of prizes 8 which accumulated in the prize discharge mechanism GP meets a stop condition serving as a change condition, each game machine GM becomes a stop state. The stop state is, as one example, a state in which the game machine GM stops collection of a predetermined consideration. Further, as one example, the stop state is canceled when a cancel condition is met. That is, when the cancel condition is met, the state of each game machine GM changes from the stop state to a normal state (capable of collecting a predetermined consideration). As one example, the state of each game machine GM changes according to the stock number of prizes 8, in this manner.

Figure 7:
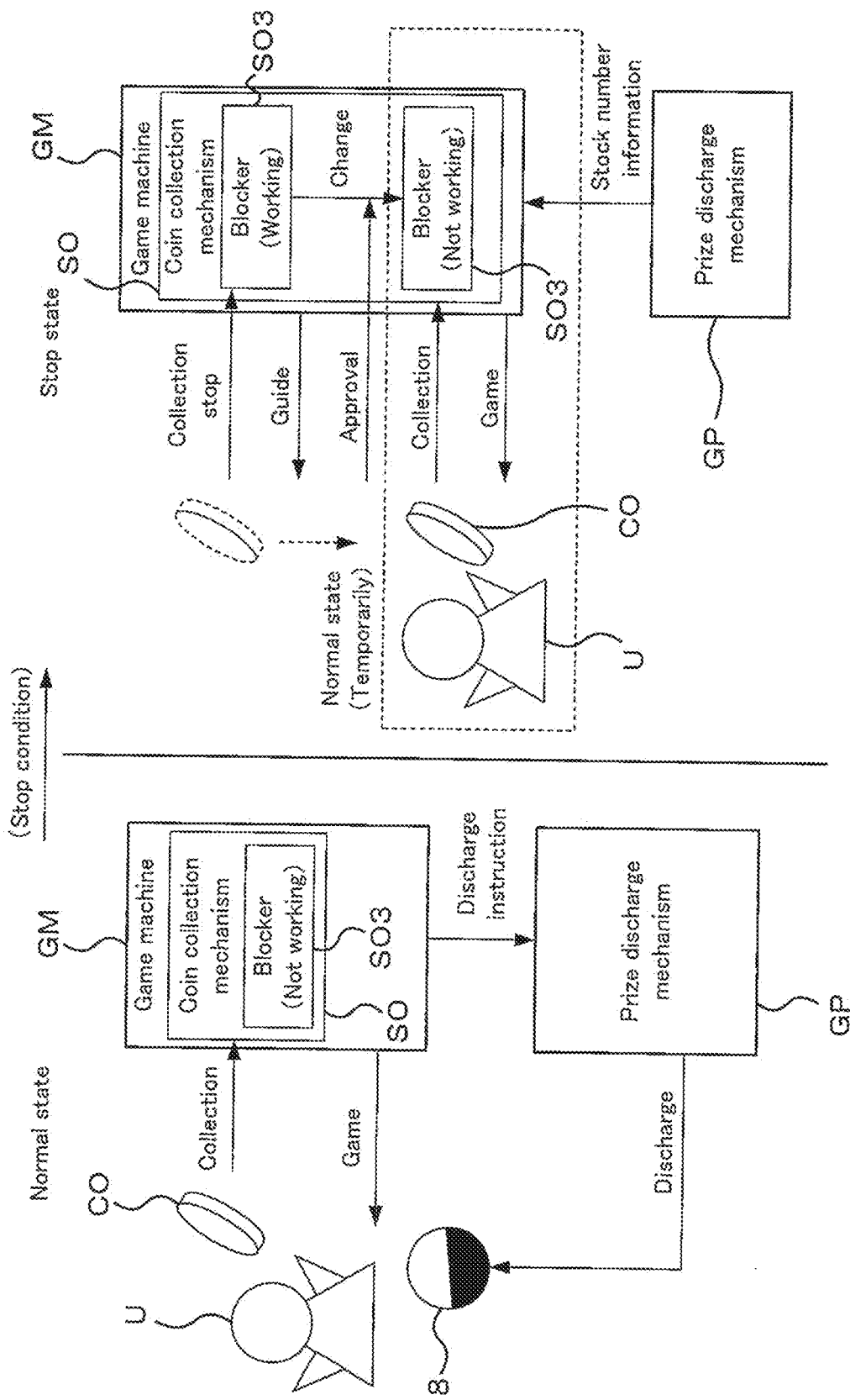
FIG. 7 is an explanatory figure for explaining one example of state change of the game machine according to the stock number of prizes.

Referring to FIG. 7, a state change of the game machine GM according to the stock number of prizes 8 will be further explained. FIG. 7 is an explanatory figure for explaining one example of state change of the game machine GM according to the stock number of prizes 8. As shown in FIG. 7, as one example, in the normal state, the game machine GM accepts collection of a predetermined consideration at any time. That is, a user U can pay (consume) coins CO in order to play a game at any time.

In concrete terms, in the normal state, each game machine GM accepts inputs of coins through the coin collection mechanism SO at any time. Further, the blocker SO3 does not work, and is in a normal state. That is, coins CO which are input from the coin input port SO1 is stored in the collection part. And, subject to the store of coins CO to the collection part, in other words after a predetermined consideration has been collected via the coins CO, each game machine GM provides a game to the user U. Further, when a prize condition is met in the game, that is when the prize mode is played, a capsule 8 (prize 8a) is discharged via the prize discharge mechanism GP. In concrete terms, the prize discharge mechanism GP discharges the capsule 8 to the user U based on a discharge instruction from the game machine GM.

On the other hand, when a stop condition is met, each game machine GM changes from a normal state to a stop state. As one example, the stop condition is met when stock number information indicates the stock number less than a predetermined number. In concrete terms, as described above, the prize discharge mechanism GP is shared by two game machines GM. As the result, there is a possibility that discharge of prizes 8 may be requested from the two game machines GM at the same time. In this case, the prize discharge mechanism GP can not execute this discharge, if two or more prizes 8 do not remain there. Therefore, as one example of the predetermined number, there is employed "1" which can not meet the request from the two game machines GM. That is, as one example, the stop condition is met when the stock number information indicates the stock number less than or equal to one. In other words, when the stock number of prizes 8 in the prize discharge mechanism GP is less than or equal to one, each game machine GM changes from a normal state to a stop state.

As one example, in the normal state, each game machine GM stops collection of coins CO to the collection part. In concrete terms, each game machine GM moves (actuates) the blocker SO3 so that a movement of coins CO to the collection part is blocked, when the stop condition is met. That is, in the stop state, the blocker SO3 changes to a stop state. As one example, each game machine GM forms the stop state in this manner. As the result, even if coins CO are input, these are blocked by the blocker SO3, and are returned from the coin discharge port SO2. That is, each game machine GM stops collection of predetermined consideration in the stop state. Therefore, the stop state is different from the normal state, each user U can not pay (consume) coins CO in order to play a game, in the stop state. Further, each game machine GM provides a game in exchange for spending of a predetermined consideration. Therefore, in the stop state, each user U can not play the game. That is, in the stop state, with the stop of collection of coins CO, each game machine GM stops provision of a game (play of a game).

On the other hand, as described above, a game which is provided by the each game machine GM has a prize mode and a non-prize mode. And, discharge of a prize 8a is requested when the non-prize mode is played. Therefore, in this case, stocks of prizes 8a are necessary for the provision of the game. In contrast, the prize 8a is not discharged when the nonprize mode is played. That is, in this case, it is not necessary that the stocks of prizes 8a are remaining for the provision of the game. Therefore, even if the stocks of prizes 8a are less than or equal to one, the game machine GM can provide a game when the nonprize mode is played. Or, when any one of two game machines GM is played in the nonprize mode, another game machine GM can provide the prize mode. Therefore, as one example, a cancel condition is met when the non-prize mode is played in the stop state as a mode of play target.

In concrete terms, each game machine GM provides a guide to each user U, in the stop state. As one example, information teaching the stop state is included in this guide. Further, as described above, the stop state is formed based on the stock number information of the prize discharge mechanism GP, when the stock number of prizes 8a is few. In other words, the stop state is formed when it is not possible to play the prize mode. Therefore, as one example, in this guide, there may be included information teaching a situation that it is not possible to play the prize mode.

Furthermore, for example, to each user, there is given an opportunity for indication of intention of whether or not each user hopes to play a game with approval for details of the guide. In concrete terms, in the opportunity for indication of intention, as one example, to the user U, there is requested an indication of intention of whether or not the user hopes to play the game even if it is not possible to play the prize mode. For example, such an opportunity may be included in the guide described above, or may be provided separately from the guide with a predetermined operation. And, as one example, a cancel condition is met when such a situation has been approved by the user U. That is, as one example, when this approval is acquired, in other words when the intention hoping to play the game even if it is not possible to play the prize mode is indicated by the user U, the stop state is canceled.

In concrete terms, if the cancel condition is met, each game machine GM changes a state of the blocker SO3 so as to not block the movement of coins CO to the collection part. That is, if the cancel condition is met, the blocker SO3 changes to the normal state which does not work so as to block the movement of coins CO. As the result, collection of a predetermined consideration using coins CO is resumed. That is, with the change to the normal state, each user U can pay (consume) coins CO in order to play a game. In other words, collection timing of the predetermined consideration changes. In concrete terms, the collection timing of the predetermined consideration is limited after the approval in the opportunity for indication of intention, in the stop state, although it is at any time in the normal state. And, each game machine GM resumes the provision of the game (non-prize mode) subject to the collection of the predetermined consideration. On the other hand, since the stop condition is met again after the provision of the game, the game machine GM changes to the stop state again. That is, with the approval of each user U, the stop state is canceled temporarily. As one example, such a normal state and a stop state are formed on the game machine GM according to the stock number of prizes 8.

Figure 8:
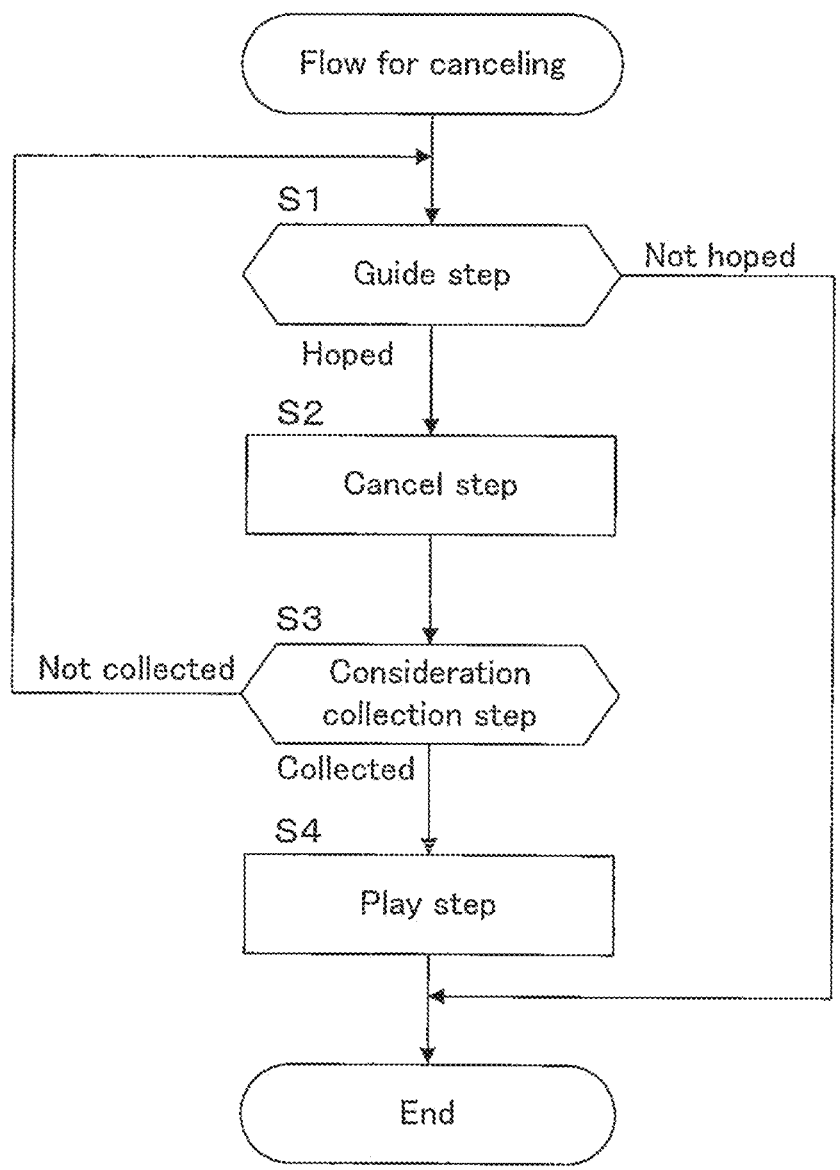
FIG. 8 is an explanatory figure for explaining one example of a flow for canceling a stop state.
Figure 9:
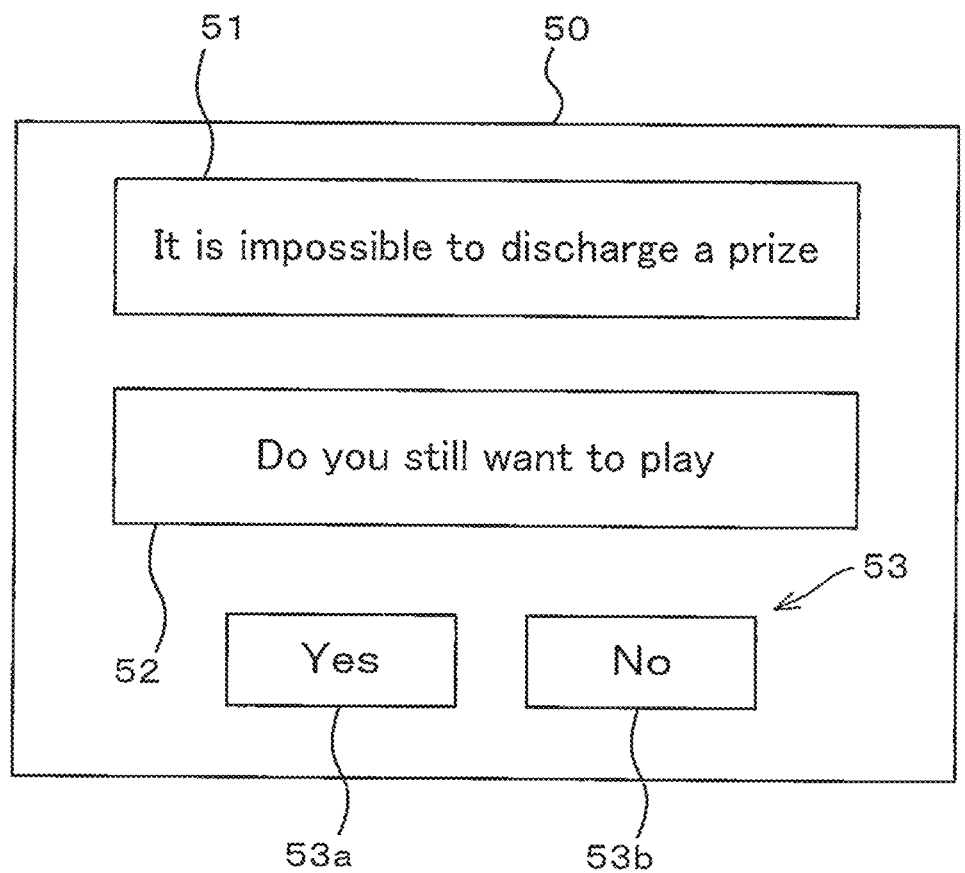
FIG. 9 is a figure schematically showing an example of a guide screen.
Figure 10:
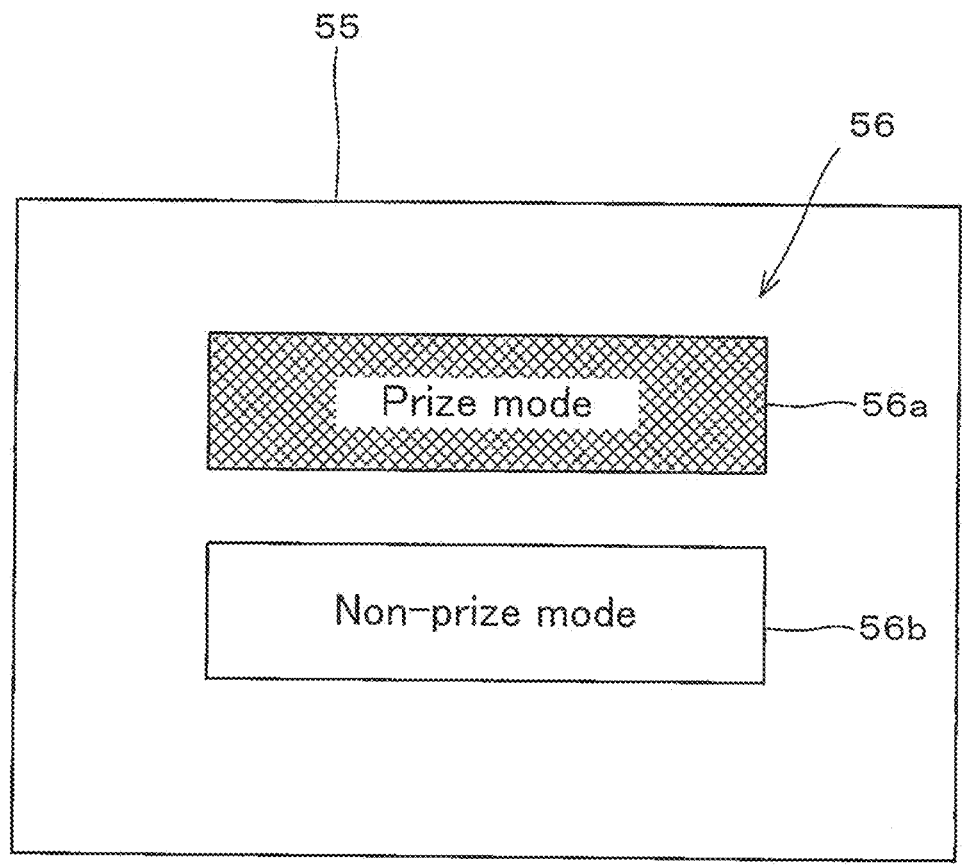
FIG. 10 is a figure schematically showing an example of a mode selection screen.

Referring to FIG. 8 to FIG. 10, a flow for canceling the stop state will be further explained. FIG. 8 is an explanatory figure for explaining one example of a flow for canceling the stop state. As shown in FIG. 8, as one example, the flow for canceling the stop state includes a guide step (step S1), a cancel step (step S2), a consideration collection step (step S3), and a play step (step S4) sequentially.

The guide step is a step for teaching the stop state described above to each user U. In the guide step, as one example, a guide screen including information teaching the stop state is displayed on the monitor MO. Further, in this guide screen, for example, there is included information teaching a situation that it is not possible to play the prize mode. Furthermore, as one example, the opportunity for indication of intention is also provided through the guide screen. And, subsequent steps are skipped and the flow for cancel is terminated, when indication of intention hoping to play a game is not acquired (the play of game is not hoped), for example, when a play of a game is not hoped in the opportunity for indication of intention, and so on. That is, in this case, the stop state is not canceled, and continued. On the other hand, when intention hoping to play a game even if it is not possible to play the prize mode is indicated (the play of game is hoped), the flow proceeds to the cancel step.

The cancel step is a step for canceling the stop state of the game machine GM. That is, in the cancel step, the state of the game machine GM is changed from the stop state to the normal state. In concrete terms, in the cancel step, a movement of the blocker SO3 is canceled. That is, the state of the blocker SO3 is changed to the normal state so that coins CO are collected to the collection part.

Next, the consideration collection step is a step for collecting a predetermined consideration. That is, in the consideration collection step, there is requested payment of the predetermined consideration through coins CO. And, subject to the payment of the predetermined consideration (when the consideration is paid), the flow proceeds to the play step. On the other hand, for example, when the predetermined consideration is not paid over a predetermined period in the consideration collection step, the flow for the cancel may be stopped. And, the blocker SO3 may move so as to be changed to the stop state again. That is, when the predetermined consideration is not collected (the consideration is not paid), the game machine GM may return to the previous stop state, and the flow may be resumed from the guide step again.

Next, the play step is a step for providing a game actually. That is, in the play step, each user U plays a game actually. Further, as one example, this step may include a step which provides a mode selection screen. The mode selection screen is a screen for selecting each mode included in the game. And, a mode corresponding to the selection result may be provided in the play step. Further, the mode selection screen may include an option which is impossible of selection in a state incapable of selection. In concrete terms, as one example, in the mode selection screen, an option corresponding to the non-prize mode may be displayed in a state capable of selection, while an option corresponding to the prize mode may be displayed in a state incapable of selection. That is, in this case, the prize mode is incapable of selection in the mode selection screen. Such a play step is provided, and the flow for selection ends. As one example, the cancel of the stop state is executed in such the flow.

FIG. 9 is a figure schematically showing an example of a guide screen. As shown in FIG. 9, as one example, the guide screen 50 includes an information area 51, an intention affirmation area 52, and option buttons 53. The information area 51 is an area for displaying information which should be taught to the user U. For example, in the information area 51, there are displayed information teaching the stop state described above and information teaching the situation incapable of playing the prize mode. The intention area 52 is an area for requesting indication of intention to the user U. Further, the option buttons 53 are buttons for accepting intention of the user U. In concrete terms, the option buttons 53 function as buttons, by touch operation to the positions of the option buttons 53 via the touch panel TP.

In the example of FIG. 9, in the information area 51, there is displayed information "it is impossible to discharge a prize". As one example, this functions as both the information teaching the stop state and the information teaching the situation incapable of playing the prize mode. Further, "Do you still want to play" is displayed in the intention area 52, and the indication of intention is requested through the option buttons 53. Further, the option buttons 53 include a "Yes" button 53a for hoping a play after approving this situation, and a "No" button 53b for not hoping a play. That is, in this case, when the "Yes" button 53a has been selected, the cancel condition is met, and the cancel step is provided. On the other hand, when the "No" button 53b has been selected, the cancel condition is not met, and the subsequent steps are skipped. As one example, such a guide screen is provided.

On the other hand, FIG. 10 is a figure schematically showing an example of a mode selection screen. As shown in FIG. 10, as one example, the mode selection screen 55 includes mode selection buttons 56. The mode selection buttons 56 are buttons for selecting modes included in the game. Therefore, on the mode selection screen, a button corresponding to each mode is displayed for each mode as each mode selection button 56. And, a game of the mode corresponding to the mode selection button 56 which has been selected is provided in the play step.

In the example of FIG. 10, the mode selection buttons 56 include the first mode button 56a and the second mode button 56b. "Prize Mode" is displayed on the first mode button 56a. That is, the first button 56a is an option for playing the prize mode. On the other hand, "Non-prize Mode" is displayed on the second mod button 56b. That is, the second mode button 56b is an option for playing the non-prize mode. Further, it is impossible to provide the prize mode in the play step which is provided in the flow of cancel. This situation is approved by the user U through the guide screen 50. Therefore, in this case, the first mode button 56a is displayed in the state incapable of selecting. That is, even if a touch operation is executed on the position of the touch panel corresponding to the first mode button 56a, the play step is not provided. On the other hand, if a touch operation is executed on the position of the touch panel corresponding to the second mode button 56b, the game of the non-prize mode is provided. As one example, such a mode selection screen 55 is provided.

Next, the initial number setting processing, the collection stop processing, the stop cancel processing, and the special progress processing will be explained. The initial number setting processing is processing for setting the predetermined number relating to the stop condition. As one example, the initial number setting processing is implemented by the control unit 20 of the prize discharge mechanism GP via the routine of FIG. 11. In concrete terms, as one example, the routine of FIG. 11 is implemented via the prize provision unit 27 of the control unit 20.

Figure 12:
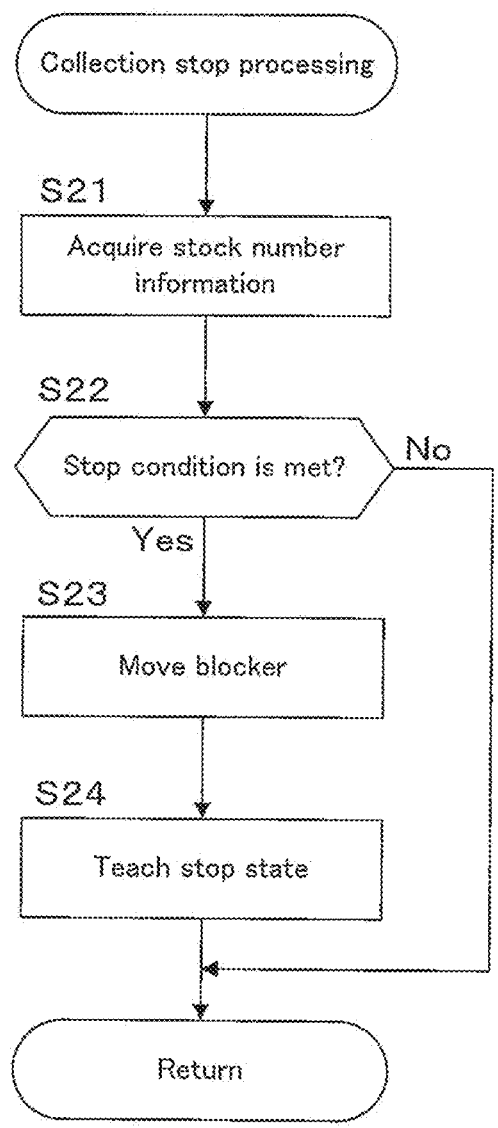
FIG. 12 is a figure showing an example of a flow chart of a collection stop processing routine.
Figure 13:
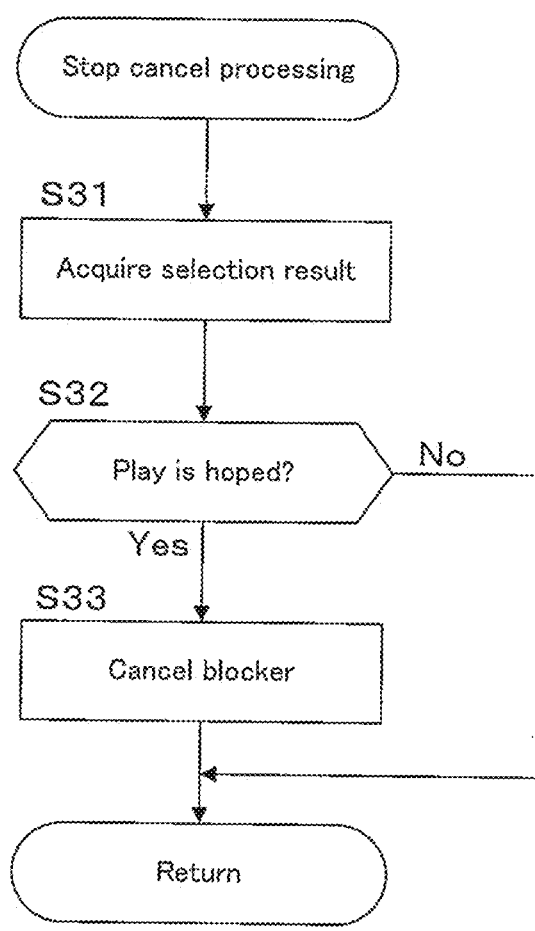
FIG. 13 is a figure showing an example of a flow chart of a stop cancel processing routine.

On the other hand, the collection stop processing is processing for changing a state of the game machine GM to the stop state. The stop cancel processing is processing for canceling the stop state of the game machine GM. Further, the special progress processing is processing for adding a special change to the progress of the game. As one example, the collection stop processing, the stop cancel processing, and the special progress processing are implemented by the control unit 10 of the game machine GM, via the routine of FIG. 12 to FIG. 14 respectively. In concrete terms, as one example, all of the routine of FIG. 12 to FIG. 14 are implemented via the game provision unit 17 of the control unit 10.

It should be understood that, apart from the processing mentioned above, the control unit 20 and the control unit 10 of the game machine GM may also execute various types of per se known processing and so on, for controlling the prize discharge mechanism GP, or providing the game. Various types of per se known processing using detection results of the reader DS1 and the photo sensors DS2 are included there. As such the processing, the control unit 20 implements, for example, processing for managing stock quantity (for example, whether or not it is five or more). However, detailed explanation thereof will be omitted.

Figure 11:
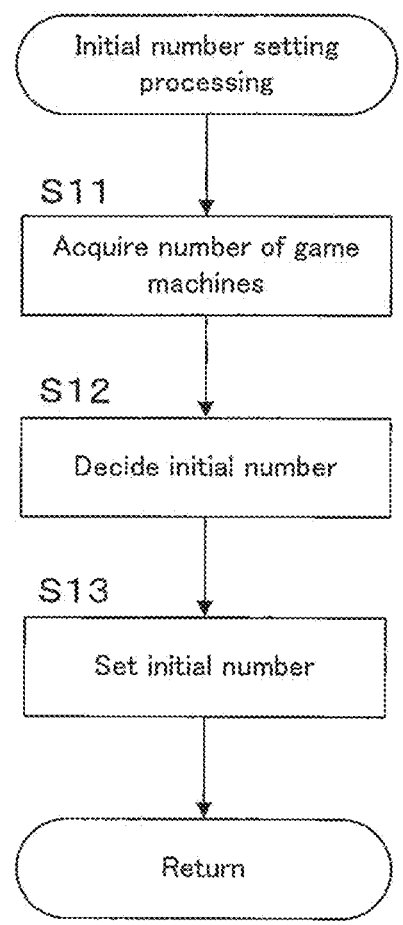
FIG. 11 is a figure showing an example of a flow chart of an initial number setting processing routine.

FIG. 11 is a figure showing an example of a flow chart of an initial number setting processing routine for implementation of the initial number setting processing. For example, the routine of FIG. 11 is executed with predetermined instruction operation which instructs setting of the initial number. Further, for example, the predetermined instruction operation is executed when the prize discharge mechanism GP is installed in a facility such as an arcade and so on. Or, for example, the routine of FIG. 11 may be executed for each predetermined time (for example, when the facility such as an arcade and so on opens or closes).

When the routine of FIG. 11 is started, first in the step S11 the prize provision unit 27 acquires the number of game machines GM. As one example, this acquirement is implemented by acquiring the number of control units 10 of the game machines GM which are connected to the control unit 20. Or, for example, the number of game machines GM may be set by the operator of the facility and so on.

Next in the step S12, the prize provision unit 27 decides the initial number. For example, this decision is implemented based on the number of game machines GM which has been acquired in the step S11. In concrete terms, as one example, the prize provision unit 27 decides the number one less than the number of game machines GM acquired in the step S11, as the initial number. For example, if the number of game machines GM acquired in the step S11 is "2", "1" one less than it is decided as the initial number.

In the next step S13, the prize provision unit 27 sets the initial number decided in the step S12 as default value (initial value) of the predetermined number used on the stop condition, and terminates this routine. Due to this, the predetermined initial number which is used on the stop condition is set automatically according to the number of game machines GM connected to the prize discharge mechanism GP. It should be understood that the predetermined number is not limited to the initial number. For example, the predetermined number may change as needed from the default value, that is the value which is set by the routine of FIG. 11. For example, if it is needed to reduce the number of prizes 8a which are not discharged and remain in the prize discharge mechanism GP, the value lower than the initial number may be set. In contrast, for example, if it is needed to prevent more safety the case that it is impossible to discharge a prize 8a while collecting coins Co, the value bigger than the initial number may be set as the predetermined number. However, it is preferred that the predetermined number is set according to the number of game machines GM connected to the prize discharge mechanism GP.

FIG. 12 is a figure showing an example of a flow chart of a collection stop processing routine for implementation of the collection stop processing. For example, the routine of FIG. 12 is executed whenever the prize discharge mechanism GP discharges each capsule 8. As one example, the discharge of each capsule 8 is detected by the discharge detection sensor 19. Further, as one example, the routine of FIG. 12 may be further executed after the execution of the routine of FIG. 12, when the routine of FIG. 13 has been executed.

When the routine of FIG. 12 is started, first in the step S21 the game provision unit 17 acquires the stock number information from the prize discharge mechanism GP. Next in the step S22, the game provision unit 17 determines whether or not the stock number information acquired in the step S21 meets the stop condition. For example, as described above, the stop condition is met when the stock number of prizes 8 remaining in the prize discharge mechanism GP is less than or equal to one. Therefore, as one example, in the step S22, based on the stock number information, the game provision unit 17 determines whether or not the stock number of prizes 8 remaining in the prize discharge mechanism GP is less than or equal to one. If this determination result is negative, in other words if the stop condition is not met (for example, if the stock number of prizes 8a are two or more), the game provision unit 17 skips the subsequent processing and terminates this routine.

On the other hand, if the result of the determination in the step S22 is affirmative, in other words if the stop condition is met (if the stock number of prizes 8a are equal to or less than one), the game provision unit 17 proceeds to the step S23. In the step S23, the game provision unit 17 moves the blocker SO3. In concrete terms, the game provision unit 17 controls the coin collection mechanism SO so that the state of the blocker SO3 is changed to the stop state.

Next in the step S24, the game provision unit 17 teaches information of the state of the game machine GM and so on, in order to announce the stop state of the game machine GM. As one example, this teaching is executed via the guide screen 50. Therefore, as one example, the game provision unit 17 displays the guide screen 50 on the monitor MO, in the step S24. And, the game provision unit 17 terminates this routine after ending the processing of the step S24. It should be understood that, for example, a waiting screen may be displayed on the monitor MO after a predetermined period, instead of the guide screen 50. The waiting screen is a screen which is switched to the guide screen 50 by an arbitrary or a predetermined touch operation of users. Further, as the waiting screen, there may be used a screen for preventing a decrease of the display function of the monitor MO (for example, burn-in and so on).

Due to the routine of FIG. 12, the state of each game machine GM is changed from the normal state to the stop state when the stock number of prizes 8a in the prize discharge mechanism GP has become equal to or less than the predetermined number. That is, the collection of the predetermined consideration through coins CO is stopped. Further, information indicating such a stop state is taught to each user U.

FIG. 13 is a figure showing an example of a flow chart of a stop cancel processing routine for implementation of the stop cancel processing. For example, the routine of FIG. 13 is executed whenever a touch operation for the option buttons 53 is executed in the guide screen 50.

When the routine of FIG. 13 is started, first in the step S31 the game provision unit 17 acquires the selection result via the option buttons 53. In concrete terms, the game provision unit 17 acquires the result of the touch operation for the option buttons 53, that is, which one of the "Yes" button 53a and the "No" button 53b has been touched.

Next in the step S32 the game provision unit 17 determines whether or not a play is hoped, based on the acquirement result of the step S31. In concrete terms, as one example, the game provision unit 17 determines that the play is hoped (affirmative result) if the selection result acquired in the step S31 is "Yes" button 53a, and determines that the play is not hoped (negative result) if that is "No" button 53b. And, if this determination result is negative, that is if the play of the game is not hoped, the game provision unit 17 skips the subsequent processing and terminates this routine.

On the other hand, if the determination result of the step S32 is affirmative, that is when the play of the game is hoped even if it is impossible to play the prize mode, the game provision unit 17 proceeds to the step S33. In the step S33, the game provision unit 17 cancels the movement of the blocker SO3. In the concrete terms, the game provision unit 17 controls the coin collection mechanism SO so that the movement of the blocker SO3 is canceled, that is, so that the state of the blocker SO3 is changed to the normal state. And, the game provision unit 17 terminates this routine after ending the processing of the step S33. Due to this, the game is provided via the affirmation of the intention of the user U, even in the stop state in which the game machine GM does not collect coins CO. In concrete terms, even if the stock number of prizes 8a which can be discharged by the prize discharge mechanism GP is equal to or less than one, the non-prize mode which does not discharge the prize 8a is provided based on the indication of intention of the user U.

FIG. 14 is a figure showing an example of a flow chart of a special progress processing routine for implementation of the special progress processing. As one example, the routine of FIG. 14 is executed whenever the information of the IC chip 38 of each prize 8a is read via the reader DS1.

When the routine of FIG. 14 is started, first in the step S41 the game provision unit 17 acquires the management information based on the output result of the reader DS1. In the next step S42, the game provision unit 17 determines whether or not the prize 8a in which the management information has been acquired meets a progress change condition. For example, this determination is executed as follows.

The game provision unit first specifies information of the prize ID included in the management information. Further, the game provision unit 17 acquires data for managing prizes, in concrete terms, the discharge management data 25a from the storage unit 21 of the prize discharge mechanism GP. Furthermore, the game provision unit 17 determines whether or not the specified prize ID is included in the discharge management data 25a, that is whether or not the prize 8a corresponding to the prize ID was discharged by the self or the game machine GM sharing the prize discharge mechanism GP. And, if this determination result is affirmative, that is if the prize ID is included in the discharge management data 25a, the game provision unit 17 determines that the progress change condition is met. On the other hand, this determination result is negative, that is if the prize ID is not included in the discharge management data 25a, the game provision unit 17 determines that the progress change condition is not met. As one example, the determination of the step S42 is executed in this manner.

And, if the determination result of the step S42 is affirmative, that is if the progress change condition is met, the game provision unit 17 proceeds to the step S43. On the other hand, if the determination result of the step S42 is negative, that is if the progress change condition is not met, the game provision unit 17 skips the subsequent processing and terminates this routine.

In the step S43, the game provision unit 17 adds a special change to the progress of the game, and terminates this routine. Due to this, when the prize 8a which is provided by each game machines GM sharing the prize discharge mechanism UP is used in these game machines GM, the special change is added to the game. That is, the self and the other game machine sharing the prize discharge mechanism GP is determined as one group, the special change is added to the game in units of these groups.

As explained above, according to this embodiment, each prize 8a is discharged through the prize discharge mechanism GP when the prize condition is met in any one of the two game machines GM. That is, the two game machines GM can share one prize discharge mechanism GP. In concrete terms, the two game machines GM can use the prize 8 of the one prize discharge mechanism GP commonly. Therefore, it is possible to match the stock number of prizes 8a between these two game machines GM sharing the prize discharge mechanism GP. Due to this, it is possible to eliminate variation in the stock number of prizes S between these two game machines GM.

Further, the stock number of capsules 8, that is, the stock number of prizes 8a is detected via the capsule detection sensor DS, in the prize discharge mechanism GP. And, the stock number information indicating the stock number of prizes 8a is acquired, and reflected to the state of the game machine GM. For example, if the stock number information meets the stop condition, the stop state is formed on the game machine GM. For example, the stop state is formed when the stock number of prizes 8a can not respond to the request of discharge of each game machine GM. In concrete terms, the stop state is formed when the stock number of prizes 8a is equal to or less than one. And, in the stop state, the game machine GM stops the collection of coins CO, that is, the collection of the predetermined consideration. That is, it is possible to stop the collection of the predetermined consideration, based on the stock number information of the prizes 8a. Due to this, for example, it is possible to stop the collection of the predetermined consideration, in the case incapable of discharging the prize 8a as described above. As the result, it is possible to improve convenience of all of users U, administrators, and so on, since it is possible to prevent the situation in which the predetermined consideration should be returned, from arising.

Furthermore, for example, the stop state of the game machine GM is canceled when the cancel condition is met. And, as one example, the cancel condition is met when the user U hopes to play the game even without the discharge of the prize 8a. In concrete terms, as one example, the cancel condition is met when the user U approves the play incapable of the prize mode. And, for example, an indication opportunity of intention of whether or not the user U approves such a situation is given to the user U via the guide screen SO. That is, it is possible to give the indication opportunity of intention of Whether or not the user cancels the stop state and plays the game, to the user U. Due to this, it is possible to reflect intention of the user U to the cancel of the stop state.

Further, if the user U approves that a play of the prize mode is impossible, that is if the user indicates intention hoping to play the non-prize mode, the stop state is canceled, and the collection of the predetermined consideration is resumed at least temporarily. That is, for example, it is possible to provide the non-prize mode not relating to the discharge of prizes 8a, while stopping the provision of the prize mode relating to the discharge of prizes 8a. In other words, even if it is impossible to discharge the prize 8a sufficiently, it is possible to provide the non-prize mode not relating to it. Due to this, it is possible to improve the rate of utilization of the game machine GM as compared to the case that the provision of the game is stopped uniformly according to the stock number of prizes 8a, that is, the case that the stop state is continued uniformly.

Furthermore, if the prize 8a which has been provided by each game machine GM sharing the prize discharge mechanism OP is used at these game machines GM, a special progress is added to the game. That is, it is possible to determine the self and the other game machine GM sharing the prize discharge mechanism GP as one group, and to add the special change to the progress of the game in a unit of this group. As the result, for example, it is possible to give preferential treatment or to not give it, in units of such groups.

In the embodiment described above, by executing the routine of FIG. 12 via the game provision unit 17, the control unit 10 of the game machine GM functions as the "stock number information acquirement device" and as the "change addition device" of the Claims. Further, by executing the routine of FIG. 11 via the game provision unit 17, the control unit 10 of the game machine GM functions as the "predetermined number setting device" of the Claims. Furthermore, by executing the routine of FIG. 14 via the game provision unit 17, the control unit 10 of the game machine GM functions as the "progress change device" of the Claims. On the other hand, by storing the discharge management data 25a, the storage unit 11 functions as "data storage device" of the Claims.

The present invention is not to be considered as being limited to the embodiment described above; it may be implemented in various other appropriate ways. For example, in the embodiment described above, the "Yes" button 53a and the "No" button 53b are employed as options for the affirmation of intention of the user U, on the guide screen 50. And, the "Yes" button 53a is used as a cancel option. However, the present invention is not limited to this type of embodiment. For example, the guide screen 50 may include the first mode button 56a and the second mode button 56b. That is, as one example, the guide screen 50 may also function as the mode selection screen 55. And, the second mode button 56b may function as the cancel option. In this case, the "Yes" button 53a and the "No" button 53b may be omitted. Furthermore, in this case, omission for the second mode button 56b, such as a case that the user U move away without the operation for the second mode button 56b, may function as another option in the selection opportunity. Therefore, the display of the first mode button 56a may be omitted. In contrast, for example, the mode selection screen 55 may be omitted, after the intention of the user U is confirmed on the guide screen 50. That is, the game of the non-prize mode may be played with no choice, not via the mode selection screen 55, after the intention of the user U is confirmed through the guide screen 50.

In the embodiment described above, the blocker SO3 moves so as to block the movement of coins CO to the collection part. However, the blocker SO3 is not limited to this type of embodiment. For example, the blocker SO3 may move so as to block input from the coin input port SO1. Further, the present invention is not limited to the embodiment which stops the collection of consideration by the blocker SO3. The coin collection mechanism SO may stop the collection of the predetermined consideration via various types of aspects.

Further, in the embodiment described above, coins CO are used for the collection of the predetermined consideration. However, the present invention is not limited to this type of embodiment. Value of various types may be used for the collection of the predetermined consideration. Therefore, such a value is not limited to value using physical medium. For example, as this type of value, there may be used electronic value. As one example, the electronic value may include electronic virtual currency or electronic currency. Therefore, the consideration collection device is not limited to the coin collection mechanism SO. For example, the readers of various types reading the electronic value, and so on may be employed as the consideration collection device. In this case, for example, the stop state may be formed by the stop of read of the electronic value, and so on.

In the embodiment described above, each prize 8a is provided via the capsule 8. However, the present invention is not limited to this type of embodiment. The prizes of various types may be provided in various types of embodiments. For example, a card such as a character card and so on may be employed as the prize. Therefore, the prize discharge mechanism GP is also not limited to the embodiment described above. Embodiments of various types may be employed so as to be able to discharge the prizes of various types. For example, the prize discharge mechanism may be formed to crane shape discharging each prize, or a printer printing a card may function as the prize discharge mechanism. As the result, in the prize discharge mechanism, various types of sensors capable of detecting the stock number of prizes of various types may be used as the capsule detection sensor, or used instead of it.

Further, the game machine GM is not to be considered as being limited to only being a commercial game machine. As far as the game is provided after collection of the predetermined consideration, for example, as the game machine GM, a stationary type game machine for home use (including a stationary type personal computer that is capable of executing a game), a portable type game machine (including a portable terminal such as a smart phone, a tablet PC, and a portable type personal computer and the like that are capable of executing a game) and so on may be employed, as appropriate. Furthermore, in the embodiment described above, the control unit 10 and the storage unit 11 were provided to the game machine GM. However, the game machine of the present invention is not to be considered as being limited to such a form. For example, the control unit 10 and the storage unit 11 may be provided logically on the network by employing cloud computing. In other words, it would be acceptable for the game machine GM to be built as a terminal that provides and displays the results of processing by the control unit 10 via network of various types.

Furthermore, in the embodiment described above, two game machines GM are connected to a prize discharge mechanism. However, the present invention is not limited to this type of embodiment. Two or more appropriate number of game machines GM may be connected to a prize discharge mechanism. Further, in the embodiment described above, a stop condition is employed as a change condition, and when the stop condition is met, the collection of predetermined consideration is stopped as a change corresponding to it. However, the change, and the change condition corresponding to it are not limited to this type of embodiment. For example, as such a change, there may be employed changes of various types which arise on the game machine GM or the prize discharge mechanism GP, such as a change which is added to the progress of the game, and so on. And, as the change condition, there may be employed conditions of various types which generate such changes.

In the following, examples of the concept of the present invention based upon the details described above are described. It should be understood that, although in the explanation below reference symbols that refer to the attached drawings are included and are written in parentheses in order to make the present invention easier to understand, the present invention is not to be considered as being limited by these reference symbols in any way.

The game system of the present invention is a game system (I) comprising: a plurality of game machines (GM) configured to provide a game respectively; and a prize discharge mechanism (GP) configured to discharge each prize (8a) from among a plurality of physical prizes (8a), and wherein the prize discharge mechanism discharges each prize when a prize condition is met in at least one of the plurality of game machines.

According to the present invention, each prize is discharged through the prize discharge mechanism when a prize condition is met in any one of game machines. That is, the plurality of game machines can share one prize discharge mechanism. In concrete terms, the plurality of game machines can use the prize of the one prize discharge mechanism commonly. Therefore, it is possible to match the stock number of prizes between these game machines sharing the prize discharge mechanism. Due to this, it is possible to prevent variation in the stock number of prizes between these game machines.

According to an aspect of the game system of the present invention, there may be further included a stock number information acquirement device (10) configured to acquire stock number information indicating stock number of prizes which can be discharged by the prize discharge mechanism; and a change addition device (10) configured to add a change to progress of the game when the stock number information met a change condition. In this case, it is possible to reflect stock situation of shared prize discharge mechanism to the progress of the game. Due to this, for example, it is possible to stop provision of the game when the stock number is few and can not be discharged. Or, when the game includes a mode relating to discharge of the prize and a mode not relating to the discharge of the prize, it is possible to provide the mode not relating to the discharge of prize, while stopping the provision of the mode relating to the discharge of prize. Due to this, it is possible to improve the rate of utilization of the game system as compared to the case that the provision of the game is stopped uniformly.

As the change condition, there may be employed various kinds of aspects using the stock number information. For example, according to an aspect of the game system of the present invention, the change condition may be met when the stock number of the prizes is equal to or less than a predetermined number.

Further, according to an aspect of the present invention in which the change condition is met when the stock number of the prizes is equal to or less than a predetermined number, there may be included a predetermined number setting device (10) configured to set number according to number of the plurality of game machines as the predetermined number. There is a possibility that the discharge is requested at same time from the plurality of game machines to the prize discharge mechanism. Therefore, it is preferred that the predetermined number is set according to the number of game machines connected to the prize discharge mechanism. In this case, it is possible to set the predetermined number according to the number of game machines. As the result, it is possible to reflect the number of game machines sharing the prize discharge mechanism to the change condition.

According to an aspect of the game system of the present invention, there may be included a data storage device (11) configured to store prize information data (25a) in which prize information for identifying each prize respectively is described; and a progress change device (10) configured to give a change to the progress of the game when a progress change condition is met, and wherein each prize may be provided with a IC chip (38) storing the prize information, the prize information corresponding to each prize which was discharged by the plurality of game machines may be described in the prize information data, each game machine may be provided with a reader (DS1) which acquires the prize information of the IC chip, the progress change condition may be met based on the prize information data when a prize corresponding to the prize information which has been acquired through the reader has been discharged by the prize discharge mechanism which is shared by each game machine. In this case, if the prize which has been provided by each game machine GM sharing the prize discharge mechanism is used at these game machines, a change is added to the progress of the game. That is, it is possible to determine the self and the other game machine sharing the prize discharge mechanism as one group, and to add the change to the progress of the game in a unit of this group. As the result, it is possible to give preferential treatment and so on, in units of such groups.

As the prize, there may be employed various kinds of aspects. For example, according to an aspect of the game system of the present invention, each prize may be stored in a case (8) of capsule type, and be provided through the case of capsule type. Further, in this aspect, the prize discharge mechanism may discharge the case of capsule type through various kinds of aspects. For example, according to an aspect of the game system of the present invention, the prize discharge mechanism may have a rotation member (34) rotating so as to deliver the case of capsule type one by one, and may discharge the case of capsule type one by one through rotation of the rotation member.

The invention claimed is:

1. A game system comprising:
   a plurality of game machines configured to provide a game respectively; and
   a prize discharge mechanism configured to discharge each prize from among a plurality of physical prizes;
   a data storage device configured to store prize information data in which prize information for identifying each prize respectively is described; and
   a progress change device configured to give a change to the progress of the game when a progress change condition is met, and wherein
   the prize discharge mechanism discharges each prize when a prize condition is met in at least one of the plurality of game machines,
   each prize is provided with an IC chip storing the prize information,
   the prize information corresponding to each prize which was discharged by the plurality of game machines is described in the prize information data,
   each game machine is provided with a reader which acquires the prize information of the IC chip when each prize is used on each game machine for the game,
   the prizes are a part of a prize group which is shared by another prize discharge mechanism different from the prize discharge mechanism, the prize information data manages whether each prize has been discharged by the prize discharge mechanism, or the other prize discharge mechanism, by including the prize information corresponding to each prize which has been discharged by the prize discharge mechanism, the progress change condition is met based on the prize information data when a prize corresponding to the prize information which has been acquired through the reader has been discharged by the prize discharge mechanism which is shared by each game machine.

2. A game system comprising:

a plurality of game machines configured to provide a game respectively; and a prize discharge mechanism configured to discharge each prize from among a plurality of physical prizes;

a stock number information acquirement device configured to acquire stock number information indicating stock number of prizes which can be discharged by the prize discharge mechanism; and a change addition device configured to add a change to progress of the game when the stock number information met a change condition, and wherein the prize discharge mechanism discharges each prize when a prize condition is met in at least one of the plurality of game machines, each gaming machine initiates play of the game in a prize mode in which each prize is discharged by relating to the prize condition, and a non-prize mode in which each prize is not discharged, the change addition device adds the change to progress of the game so as to allow each gaming machine to initiate play of the game in the non-prize mode after the play of the non-prize mode has been selected in a step for selecting whether or not a user plays the game in the non-prize mode when the change condition is met, and allow each gaming machine to initiate play of the game in the prize mode when the change condition is not met.

3. A game system according to claim 2, wherein the change condition is met when the stock number of the prizes is equal to or less than a predetermined number.

4. A game system according to claim 3, comprising a predetermined number setting device configured to set number according to number of the plurality of game machines as the predetermined number.

5. A game system according to claim 2, wherein each prize is stored in a case of capsule type, and is provided through the case of capsule type.

6. A game system according to claim 5, wherein the prize discharge mechanism has a rotation member rotating so as to deliver the case of capsule type one by one, and discharges the case of capsule type one by one through rotation of the rotation member.

7. A game system comprising:

a plurality of game machines configured to provide a game respectively;

a prize discharge mechanism configured to discharge each prize from among a plurality of physical prizes;

a data storage device configured to store prize information data in which prize information for identifying each prize respectively is described; and a progress change device configured to give a change to the progress of the game when a progress change condition is met;

wherein the prize discharge mechanism discharges each prize when a prize condition is met in at least one of the plurality of game machines, each prize is provided with an IC chip storing the prize information, the prize information including a unique chassis ID associated with a corresponding game machine, the prize information corresponding to each prize which was discharged by the plurality of game machines is described in the prize information data;

wherein each game machine is provided with a reader which acquires the prize information of the IC chip when each prize is used on each game machine for the game; and wherein the progress change condition is met based on the prize information data upon determining that the unique chassis ID included in the prize information acquired through the reader matches the corresponding game machine that has acquired the prize information indicating that a prize corresponding to the prize information which has been acquired has been discharged by the prize discharge mechanism which is shared by each game machine.

* * * * *